United States Patent
Xue et al.

(10) Patent No.: US 12,082,208 B2
(45) Date of Patent: Sep. 3, 2024

(54) TECHNIQUES FOR GRANTING RESOURCES FOR INTERNET OF THINGS COMMUNICATIONS

(71) Applicant: QUALCOMM Incorporated, San Diego, CA (US)

(72) Inventors: Yisheng Xue, San Diego, CA (US); Chih-Hao Liu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 17/326,189

(22) Filed: May 20, 2021

(65) Prior Publication Data

US 2022/0377786 A1 Nov. 24, 2022

(51) Int. Cl.
*H04W 72/23* (2023.01)
*H04L 1/1867* (2023.01)
*H04W 24/08* (2009.01)
*H04W 72/0446* (2023.01)
*H04W 74/0808* (2024.01)

(52) U.S. Cl.
CPC ........... *H04W 72/23* (2023.01); *H04L 1/1896* (2013.01); *H04W 24/08* (2013.01); *H04W 72/0446* (2013.01); *H04W 74/0825* (2013.01)

(58) Field of Classification Search
CPC . H04W 72/23; H04W 24/08; H04W 72/0446; H04W 74/0825; H04L 1/1896
See application file for complete search history.

(56) References Cited

U.S. PATENT DOCUMENTS

| 11,722,998 | B2 * | 8/2023 | Sebire | H10K 50/11 |
| | | | | 257/40 |
| 11,871,407 | B2 * | 1/2024 | Wei | H04L 1/1822 |
| 2019/0268933 | A1 | 8/2019 | Sun et al. | |
| 2020/0053749 | A1 * | 2/2020 | Liu | H04W 72/23 |
| 2020/0068495 | A1 * | 2/2020 | Yang | H04W 52/325 |
| 2020/0259896 | A1 | 8/2020 | Sachs et al. | |
| 2021/0045093 | A1 | 2/2021 | Rao et al. | |

(Continued)

OTHER PUBLICATIONS

International Search Report and Written Opinion—PCT/US2022/071697—ISA/EPO—Jun. 30, 2022.

(Continued)

*Primary Examiner* — Christopher M Crutchfield
*Assistant Examiner* — Tito Q Pham
(74) *Attorney, Agent, or Firm* — Holland & Hart LLP

(57) ABSTRACT

Methods, systems, and devices for wireless communications are described. In some examples, a base station may transmit, to a secondary user equipment (UE), a first grant to conditionally transmit one or more data messages over a first set of resources upon completion of a detection procedure. The detection procedure may include monitoring a second set of resources for over-the-air (OTA) signals transmitted by a primary UE pursuant to a second grant, where the first set of resources at least partially overlaps the second set of resources. The UE may monitor for the OTA signals from the primary UE, determine that one or more conditions for transmission of the one or more data messages have been satisfied, and transmit the one or more data messages over the first set of resources.

21 Claims, 19 Drawing Sheets

(56) References Cited

U.S. PATENT DOCUMENTS

| | | | | |
|---|---|---|---|---|
| 2021/0051701 A1* | 2/2021 | Fakoorian | | H04L 1/1896 |
| 2021/0120560 A1* | 4/2021 | Kutz | | H04L 1/0053 |
| 2021/0367745 A1* | 11/2021 | Zhao | | H04W 72/23 |
| 2022/0287074 A1* | 9/2022 | Bai | | H04W 72/1268 |
| 2022/0304003 A1* | 9/2022 | Sun | | H04L 1/1861 |
| 2022/0393794 A1* | 12/2022 | Wang | | H04W 72/23 |
| 2023/0128924 A1* | 4/2023 | Ganesan | | H04W 74/0816 |
| | | | | 370/329 |
| 2023/0232371 A1* | 7/2023 | Gerami | | H04W 72/02 |
| | | | | 370/329 |
| 2023/0319874 A1* | 10/2023 | Myung | | H04W 72/0457 |
| | | | | 370/329 |

OTHER PUBLICATIONS

Lg Electronics: "Discussion on Resource Conflict Between PUSCHs", 3GPP TSG RAN WG1 #97, 3GPP Draft, R1-1906670 Discussion on Resource Conflict Between PUSCHs, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), 4 Pages, XP051708706, Retrieved from the Internet: URL: http://www.3gpp.org/ftp/tsg%5Fran/WG1%5FRL1/TSGR1%5F97/Docs/R1%2D1906670%2Ezip, [retrieved on May 4, 2019], Collision between/among multiple configured grants, p. 2, paragraph 3—p. 3.

* cited by examiner

Resources Allocated to 1st UE      Resources Allocated to 2nd UE

TECHNIQUES FOR GRANTING RESOURCES FOR INTERNET OF THINGS COMMUNICATIONS

FIELD OF TECHNOLOGY

The following relates to wireless communications, including techniques for granting resources for Internet of Things (IoT) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support Internet of Things (IoT) devices. IoT devices may be described as everyday objects that have the ability to transmit and receive data. In some examples, data may arrive at IoT devices sporadically with strict latency requirements and current scheduling of IoT devices for such data traffic may be inefficient.

SUMMARY

The described techniques relate to improved methods, systems, devices, and apparatuses that support techniques for granting resources for Internet of Things (IoT) communications. Generally, the described techniques provide for a wireless communications system to apply over-provisioning resource allocation techniques when issuing a dynamic grant. In some examples, a base station may predict that data will arrive at a first UE and may transmit a dynamic grant to the first UE to transmit the data over a first set of resources. Additionally, the base station may transmit a conditional grant to a second UE to conditionally transmit data over a second set of resources upon completion of a detection procedure, where the second set of resources at least partially overlaps the first set of resources. The detection procedure may include monitoring at least a portion of the first set of resources for one or more over-the-air (OTA) messages. The second UE may perform the detection procedure and determine whether one or more conditions of the conditional grant are satisfied. In one example, the one or more conditions of the conditional grant may be satisfied if the second UE fails to detect the one or more OTA message as part of the detection procedure. If the one or more conditions of the conditional grant are satisfied, the second UE may transmit the data over the second set of resources.

A method for wireless communication at a secondary UE is described. The method may include receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources, monitoring, as part of the detection procedure, for the one or more OTA signals from the primary UE, the one or more OTA signals indicative of whether the second set of resources is used by the primary UE, determining, based on the monitoring, that one or more conditions for transmission of the one or more data messages have been satisfied via the detection procedure, and transmitting the one or more data messages over the first set of resources based on the one or more conditions being satisfied.

An apparatus for wireless communication at a secondary UE is described. The apparatus may include a processor, memory coupled with the processor, and instructions stored in the memory. The instructions may be executable by the processor to cause the apparatus to receive, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources, monitor, as part of the detection procedure, for the one or more OTA signals from the primary UE, the one or more OTA signals indicative of whether the second set of resources is used by the primary UE, determine, based on the monitoring, that one or more conditions for transmission of the one or more data messages have been satisfied via the detection procedure, and transmit the one or more data messages over the first set of resources based on the one or more conditions being satisfied.

Another apparatus for wireless communication at a secondary UE is described. The apparatus may include means for receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources, means for monitoring, as part of the detection procedure, for the one or more OTA signals from the primary UE, the one or more OTA signals indicative of whether the second set of resources is used by the primary UE, means for determining, based on the monitoring, that one or more conditions for transmission of the one or more data messages have been satisfied via the detection procedure, and means for transmitting the one or more data messages over the first set of resources based on the one or more conditions being satisfied.

A non-transitory computer-readable medium storing code for wireless communication at a secondary UE is described. The code may include instructions executable by a processor to receive, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources, monitor, as part of the detection procedure, for the one or more OTA signals from the primary UE, the one or more OTA signals indicative of whether the second set of resources is used by the primary UE, determine, based on the monitoring, that one or more conditions for transmission of the one or more data messages have been satisfied via the detection procedure, and transmit the one or more data messages over the first set of resources based on the one or more conditions being satisfied.

In some examples of the method, apparatuses, and non-transitory computer-readable medium described herein, determining that the one or more conditions may have been satisfied may include operations, features, means, or instructions for failing to detect the one or more OTA signals from the primary UE.

In some examples of the method, apparatuses, and non-transitory computer-readable medium described herein, monitoring for the one or more OTA signals from the primary UE may include operations, features, means, or instructions for monitoring, as part of the detection procedure, during a time gap that extends from a beginning of the second set of resources and a subsequent beginning of the first set of resources.

In some examples of the method, apparatuses, and non-transitory computer-readable medium described herein, monitoring during the time gap may include operations, features, means, or instructions for monitoring the second set of resources during the time gap for the one or more OTA signals by the primary UE, where the one or more conditions may be satisfied via the detection procedure upon failure by the secondary UE to detect the one or more OTA signals by the primary UE during the time gap.

In some examples of the method, apparatuses, and non-transitory computer-readable medium described herein, monitoring during the time gap may include operations, features, means, or instructions for monitoring the second set of resources for a listen-before-talk (LBT) transmission during the time gap, where the time gap may be defined by a cyclic prefix (CP) extension for use by the primary UE to transmit the LBT transmission, where the one or more conditions may be satisfied via the detection procedure upon failure by the secondary UE to detect an energy level during the time gap that may be above a threshold.

In some examples of the method, apparatuses, and non-transitory computer-readable medium described herein, monitoring during the time gap may include operations, features, means, or instructions for monitoring the second set of resources during the time gap for the one or more OTA signals by the primary UE, where the time gap includes multiple transmission opportunities for the primary UE, where the one or more conditions may be satisfied via the detection procedure upon failure by the secondary UE to detect any of the one or more OTA signals by the primary UE during the time gap.

In some examples of the method, apparatuses, and non-transitory computer-readable medium described herein, monitoring during the time gap may include operations, features, means, or instructions for monitoring the second set of resources during the time gap for one or more demodulation reference signal (DMRS) sequences associated with the primary UE, where the second set of resources may be aggregated uplink slots and the time gap may be at least one slot in duration, where the one or more conditions may be satisfied via the detection procedure upon failure by the secondary UE to detect the one or more DMRS sequences during the time gap.

In some examples of the method, apparatuses, and non-transitory computer-readable medium described herein, monitoring during the time gap may include operations, features, means, or instructions for monitoring the second set of resources during the time gap for a sidelink control information (SCI) message by the primary UE, where the one or more conditions may be satisfied via the detection procedure upon failure by the secondary UE to detect the SCI message during the time gap.

In some examples of the method, apparatuses, and non-transitory computer-readable medium described herein, monitoring during the time gap may include operations, features, means, or instructions for monitoring the second set of resources during the time gap for both a SCI message by the primary UE and an acknowledgement (ACK) feedback message associated with the SCI message, where the one or more conditions may be satisfied via the detection procedure upon detection by the secondary UE of the ACK feedback message during the time gap.

Some examples of the method, apparatuses, and non-transitory computer-readable medium described herein may further include operations, features, means, or instructions for determining a resource to monitor for the ACK feedback message by either decoding the SCI message or through the first grant.

In some examples of the method, apparatuses, and non-transitory computer-readable medium described herein, monitoring for the one or more OTA signals from the primary UE may include operations, features, means, or instructions for monitoring, as part of the detection procedure, for an early occupancy indication transmitted by the primary UE prior in time to both the first set of resources and the second set of resources.

In some examples of the method, apparatuses, and non-transitory computer-readable medium described herein, monitoring for the early occupancy indication may include operations, features, means, or instructions for monitoring for a sounding reference signal (SRS) from the primary UE, where the one or more conditions may be satisfied via the detection procedure upon failure by the secondary UE to detect the SRS as the early occupancy indication from the primary UE.

In some examples of the method, apparatuses, and non-transitory computer-readable medium described herein, monitoring for the early occupancy indication may include operations, features, means, or instructions for monitoring a sidelink feedback channel resource for the early occupancy indication from the primary UE, where the one or more conditions may be satisfied via the detection procedure upon failure based on a content of the sidelink feedback channel resource.

Some examples of the method, apparatuses, and non-transitory computer-readable medium described herein may further include operations, features, means, or instructions for receiving, via the first grant, a first uplink control channel resource for transmission by the secondary UE of a first indication confirming transmission of the one or more data messages over the first set of resources, where the second grant also includes a second uplink control channel resource for transmission by the primary UE of a second indication confirming transmission over the second set of resources.

In some examples of the method, apparatuses, and non-transitory computer-readable medium described herein, the first indication by the secondary UE may be a scheduling request (SR) for retransmission of the one or more data messages.

Some examples of the method, apparatuses, and non-transitory computer-readable medium described herein may further include operations, features, means, or instructions for receiving, via the first grant, a first uplink control channel resource for transmission by the secondary UE of a message indicating whether the one or more conditions may be satisfied.

In some examples of the method, apparatuses, and non-transitory computer-readable medium described herein, receiving the first grant may include operations, features, means, or instructions for receiving a downlink control information (DCI) message that includes both the first grant and the second grant.

In some examples of the method, apparatuses, and non-transitory computer-readable medium described herein, the DCI message may be scrambled by a group common random network temporary identifier (GC-RNTI) that may be allocated to at least the secondary UE and the primary UE as supporting non-provisioning proactive dynamic grants and that may have downlink control channel aggregation levels that may be within common thresholds.

A method for wireless communication at a base station is described. The method may include transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources and transmitting the second grant to the primary UE, the second grant including a parameter indicating that transmission by the primary UE using the second set of resources is optional.

An apparatus for wireless communication at a base station is described. The apparatus may include a processor, memory coupled with the processor, and instructions stored in the memory. The instructions may be executable by the processor to cause the apparatus to transmit, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources and transmit the second grant to the primary UE, the second grant including a parameter indicating that transmission by the primary UE using the second set of resources is optional.

Another apparatus for wireless communication at a base station is described. The apparatus may include means for transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources and means for transmitting the second grant to the primary UE, the second grant including a parameter indicating that transmission by the primary UE using the second set of resources is optional.

A non-transitory computer-readable medium storing code for wireless communication at a base station is described. The code may include instructions executable by a processor to transmit, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources and transmit the second grant to the primary UE, the second grant including a parameter indicating that transmission by the primary UE using the second set of resources is optional.

In some examples of the method, apparatuses, and non-transitory computer-readable medium described herein, transmitting the second grant to the primary UE may include operations, features, means, or instructions for transmitting the parameter as a bit field which indicates that use of the second set of resources by the primary UE may be based on whether the primary UE may have content to transmit during the second set of resources.

In some examples of the method, apparatuses, and non-transitory computer-readable medium described herein, transmitting the first grant for conditional transmission of the one or more data messages may include operations, features, means, or instructions for transmitting the first grant as a conditional grant that may be conditional on the secondary UE failing to detect, via the detection procedure, use of the second set of resources by the primary UE.

In some examples of the method, apparatuses, and non-transitory computer-readable medium described herein, a time gap extends from a beginning of the second set of resources and a subsequent beginning of the first set of resources.

In some examples of the method, apparatuses, and non-transitory computer-readable medium described herein, transmitting the first grant for conditional transmission of the one or more data messages may include operations, features, means, or instructions for transmitting the first grant as a conditional grant that may be conditional on the secondary UE failing to detect, via the detection procedure, one or more OTA signals by the primary UE during the time gap.

In some examples of the method, apparatuses, and non-transitory computer-readable medium described herein, transmitting the first grant for conditional transmission of the one or more data messages may include operations, features, means, or instructions for transmitting the first grant as a conditional grant that may be conditional on the secondary UE failing to detect, via the detection procedure, an LBT transmission by the primary UE during the time gap, where the time gap may be defined by a cyclic prefix extension for use by the primary UE to transmit the LBT transmission.

In some examples of the method, apparatuses, and non-transitory computer-readable medium described herein, the time gap includes multiple transmission opportunities for the primary UE.

In some examples of the method, apparatuses, and non-transitory computer-readable medium described herein, the second set of resources may be aggregated uplink slots and the time gap may be at least one slot in duration.

Some examples of the method, apparatuses, and non-transitory computer-readable medium described herein may further include operations, features, means, or instructions for transmitting, via the first grant, a first uplink control channel resource for use by the secondary UE to transmit a first indication confirming transmission of the one or more data messages over the first set of resources and transmitting, via the second grant, a second uplink control channel resource for use by the primary UE to transmit a second indication confirming transmission over the second set of resources.

Some examples of the method, apparatuses, and non-transitory computer-readable medium described herein may further include operations, features, means, or instructions for receiving the first indication from the secondary UE via an SR for retransmission of the one or more data messages.

Some examples of the method, apparatuses, and non-transitory computer-readable medium described herein may further include operations, features, means, or instructions for transmitting, via the first grant, a first uplink control channel resource for use by the secondary UE to transmit a message indicating whether one or more conditions associated with the conditional transmission of the one or more data messages over the first set of resources may be satisfied.

In some examples of the method, apparatuses, and non-transitory computer-readable medium described herein, the first grant and the second grant may be transmitted in a same DCI message.

In some examples of the method, apparatuses, and non-transitory computer-readable medium described herein, the DCI message may be scrambled by a GC-RNTI that may be allocated to at least the secondary UE and the primary UE as supporting non-provisioning proactive dynamic grants and that may have downlink control channel aggregation levels that may be within common thresholds.

DETAILED DESCRIPTION

In some examples, a user equipment (UE) may be an Internet of Things (IoT) device. Some IoT devices may regularly report uplink data and may benefit from a configured grant, which allocates resources to the UE for regular uplink messages. However, for IoT devices that report data sporadically, resources allocated via configured grant may be unused. Dynamic granting of resources may, in some cases, be appropriate. In dynamic grants, the UE may determine that it has data to transmit and may send a scheduling request (SR) to a base station, requesting resources for uplink transmission. The base station may then provide, dynamically, a grant of resources for the UE to use for uplink transmission. However, the back-and-forth that arises from transmission of an SR and then awaiting a resource grant may not be appropriate for IoT devices having strict latency requirements.

As described herein, a wireless communications system may utilize over-provisioning techniques when providing a proactive dynamic grant to a UE. For example, UEs operating in an IoT system may receive coupled control information for transmitting pending data over partially overlapping resources. Control information received by a UE may be coupled, via a conditional grant, to control information sent to a different UE. For example, a first UE may receive a proactive dynamic grant to transmit data over a first set of resources and a second UE may receive a conditional grant to transmit data over a second set of resources if the second UE does not detect an over-the-air (OTA) message from the first UE. The first set of resources and the second set of resources may at least partially overlap. The first UE may determine whether it has pending data. If the first UE does not have pending data, the first UE may skip the proactive dynamic grant and may not transmit data. As such, the second UE may not detect an OTA message from the first UE and may transmit over the second set of resources. In some examples, the OTA message may be a demodulation reference signal (DMRS), a listen-before-talk (LBT) transmission, sidelink control information (SCI), a hybrid automatic repeat request (HARQ) response, or an early occupancy indication (e.g., a sounding reference signal (SRS)).

Aspects of the disclosure are initially described in the context of wireless communications systems. Additional aspects of the disclosure are described in the context of detection procedures and a process flow. Aspects of the disclosure are further illustrated by and described with reference to apparatus diagrams, system diagrams, and flowcharts that relate to techniques for granting resources for IoT communications.

Figure 1:
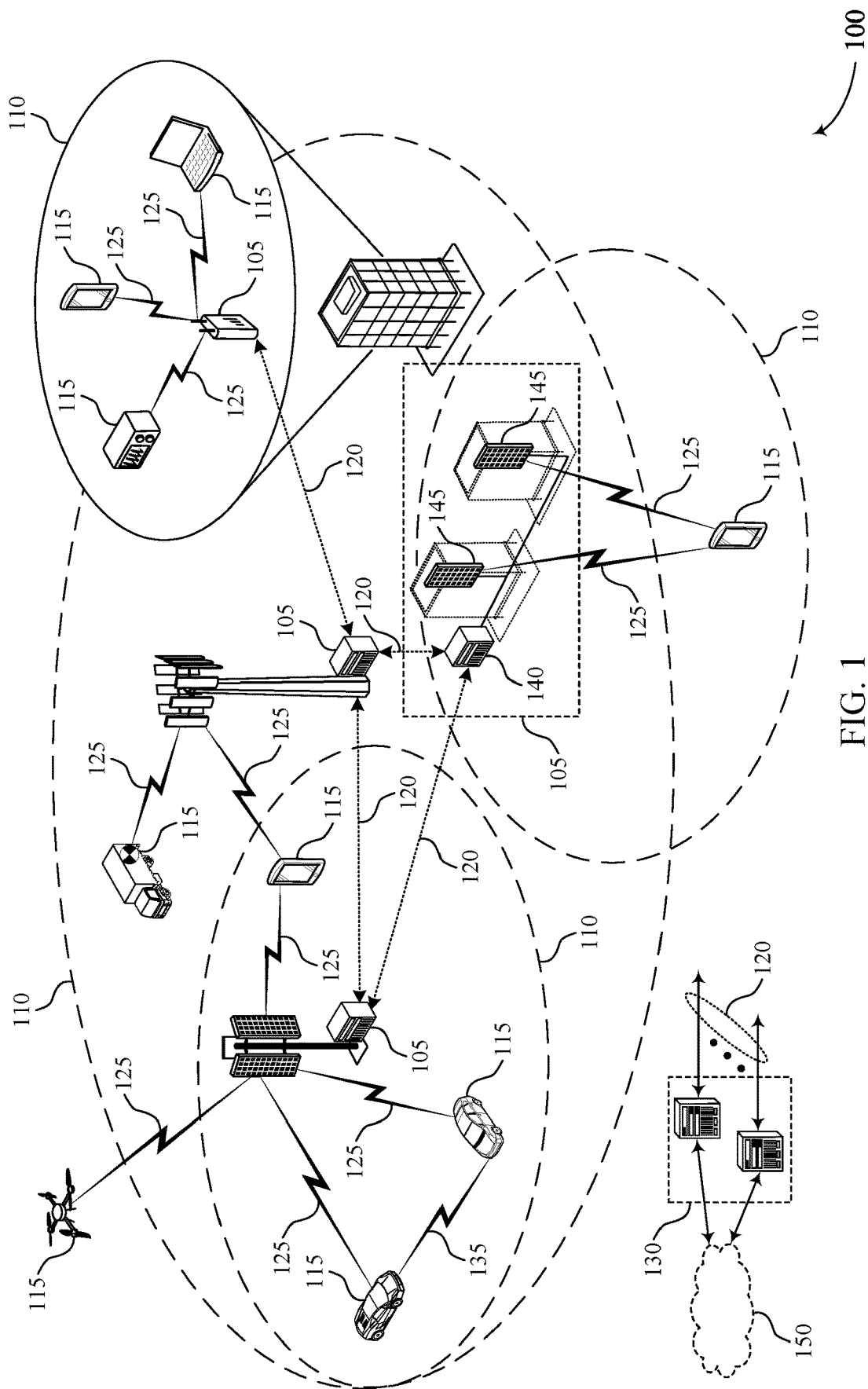
FIGS. 1 and 2 illustrate examples of a wireless communications system that supports techniques for granting resources for Internet of Things (IoT) communications in accordance with aspects of the present disclosure.

FIG. 1 illustrates an example of a wireless communications system 100 that supports techniques for granting resources for IoT communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix (CP) prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless communications system may apply over-provisioning resource techniques when providing UEs 115 with a dynamic grant. In some examples, a base station 105 may predict that data will arrive at a first UE 115 and may transmit a dynamic grant to the first UE 115 to transmit the data over a first set of resources. Additionally, the base station 105 may transmit a conditional grant to a second UE 115 to conditionally transmit data over a second set of resources upon completion of a detection procedure, where the second set of resources at least partially overlap the first set of resources. The detection procedure may include monitoring at least a portion of the first set of resources for one or more OTA messages. The second UE 115 may perform the detection procedure and determine whether one or more conditions of the conditional grant are satisfied. In one example, the one or more conditions of the conditional grant may be satisfied if the second UE 115 fails to detect the one or more OTA message as part of the detection procedure. If the one or more conditions of the conditional grant are satisfied, the second UE 115 may transmit the data over the second set of resources.

Figure 2:
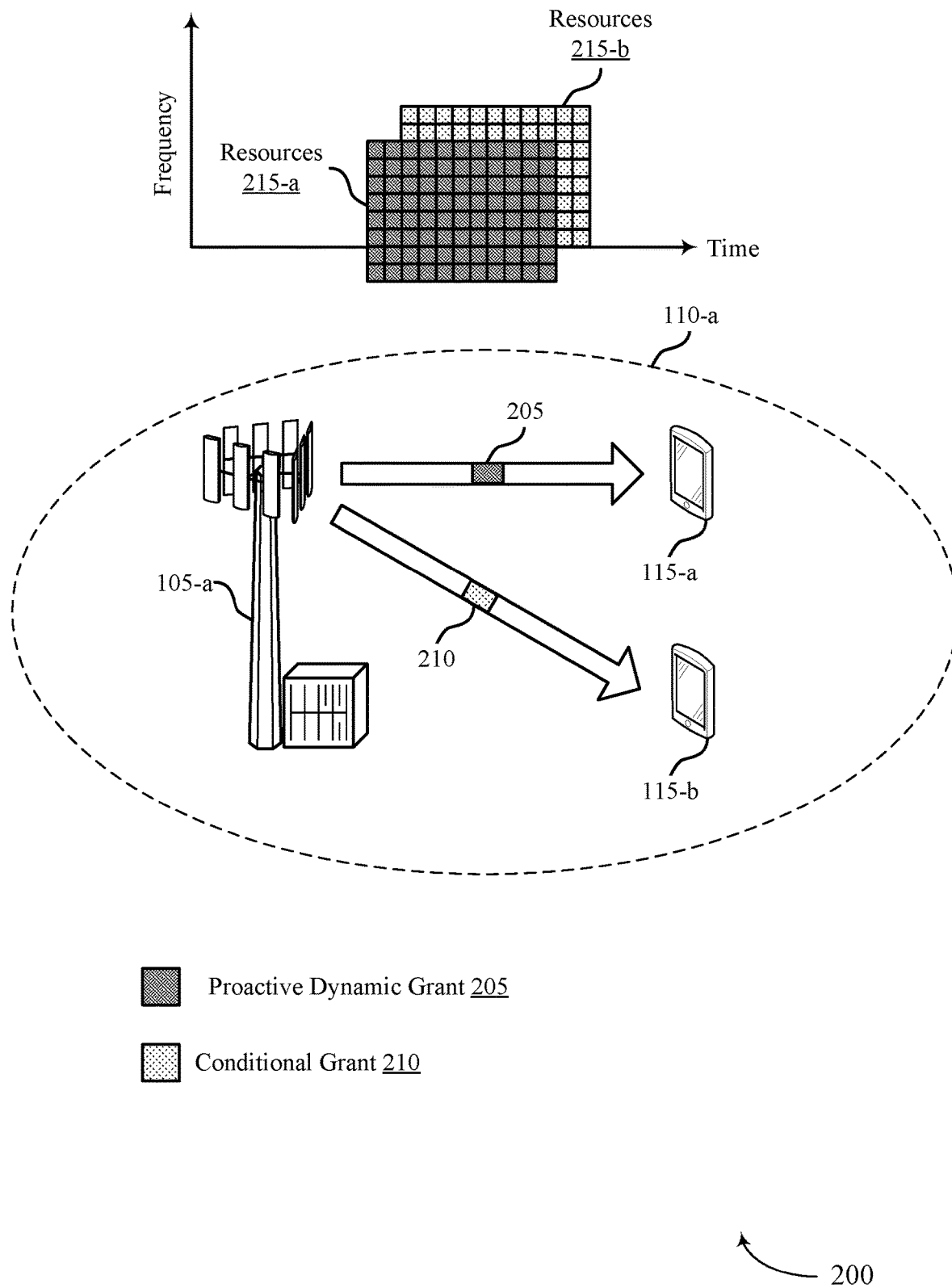

FIG. 2 illustrates an example of a wireless communications system 200 that supports techniques for granting resources for IoT communications in accordance with aspects of the present disclosure. The wireless communications system 200 may include a base station 105-a, a UE 115-a, and a UE 115-b. In some examples, the wireless communications system 200 may implement aspects of a wireless communications system 100. For example, the base station 105-a, the UE 115-a, and the UE 115-b may be examples of a base station 105 and UEs 115 as described with reference to FIG. 1. The base station 105-a, the UE 115-a, and the UE 115-b may be located in a coverage area 110-a.

In some examples, the wireless communications system 200 may include IoT devices. An IoT device may be described as an everyday object that has the capability to transmit and receive data from a network. Moreover, IoT devices may be designed to interact with the physical world and may include components such as sensors or cameras. In some examples, the UE 115-a and the UE 115-b may be examples of IoT devices.

In order to transmit pending data to the base station 105-a, the UEs 115 may undergo an access procedure. Performing the access procedure may allow the UEs 115 to determine resources (e.g., time and frequency resources) on which to transmit pending data to the base station 105-a or other UEs 115. In one example, the UEs 115 may gain access on a session-by-session basis. That is, when the UEs 115 have pending data to transmit, the UEs 115 may transmit an SR to the base station 105-a and in response to the SR, the base station 105-a may transmit a dynamic grant to the UEs 115 indicating resources on which to transmit the pending data.

As another example, UEs 115 may gain access on a frame-by-frame basis. In such example, the UEs 115 may be configured with a configured grant occasion at a known periodicity and may transmit pending data during the configured grant occasion without transmitting an SR request. In some examples, the UEs 115 may be configured with multiple configured grant processes. If the UE 115 misses a configured grant occasion of a first configured grant process, the UE 115 may transmit pending data during a configured grant occasion of a different configured grant process. In some examples, gaining access using session-based access procedures may take longer than gaining access using frame-based access procedures. As such, session-based access may be preferable when UEs 115 have a large amount of pending data (e.g., pending data is above a threshold) with less strict latency requirements and frame-based channel access may be preferable when UEs 115 have a small amount of pending data (e.g., pending data is below a threshold) with more strict latency requirements. The problem with frame-based channel access, however, is that if data arrives at UE 115 sporadically with relatively strict latency requirements, configuring the UEs 115 with the number of configured grant occasions to accommodate such data traffic may result in wasted resources.

As an alternative to frame-based access, the UEs 115 may utilize proactive dynamic grants 205. That is, the base station 105-a may predict data traffic patterns (e.g., using artificial intelligence (AI) or machine learning) and transmit proactive dynamic grants 205 to UEs 115 based on the predicted data traffic patterns. Because data may arrive at UE 115 sporadically, the base station 105-a may incorrectly predict the data traffic pattern and may transmit a proactive dynamic grant 205 to UEs 115 when UEs 115 do not have pending data to transmit. As such, UEs 115 may be configured with a parameter that may allow the UEs 115 to skip the proactive dynamic grant 205 (e.g., skipUplinkTxDynamic) in the event that the UEs 115 do not have pending data. However, even if UEs 115 may skip the proactive dynamic grant 205, the base station 105-a and other UEs 115 may deduce that resources indicated in the proactive dynamic grant 205 are occupied and may not transmit on these resources resulting in wasted resources.

In some examples, the wireless communications system 200 may support over-provisioning resource allocation techniques. Over-provisioning resource allocation techniques may allow the base station 105-a to schedule a UE 115 to transmit over resources where at least some of the resources are allocated to another UE 115. That is, using over-provisioning resource allocation techniques, the base station 105-a may allocate resources to the UE 115 even if there is a chance that the UE 115's transmission may be blocked by the other UE 115. Using such techniques may decrease the probability of wasting resources, for example, in the event that the UE 115 has data to transmit and the other UE 115 does not have data to transmit.

As described herein, the base station 105-a may apply over-provisioning resource allocation techniques when providing UEs 115 with proactive dynamic grants 205. In some examples, the base station 105-a may predict that the UE 115-a has pending data to transmit and as such, may transmit a proactive dynamic grant 205 to the UE 115-a. The proactive dynamic grant 205 may instruct the UE 115-a to transmit pending data over resources 215-a and may also include an indication to skip the proactive dynamic grant 205 if the UE 115-a does not have pending data. Moreover, the base station 105-a may transmit a conditional grant 210 to the UE 115-b. The conditional grant 210 may instruct the UE 115-b to transmit pending data over the resources 215-b upon satisfaction of one or more conditions. In some examples, the resources 215-a and the resources 215-b may overlap at least partially in time and frequency. In one example, to determine whether the one or more conditions are met, the UE 115-b may perform a detection procedure. For example, the one or more conditions may be satisfied if the UE 115-b determines that the UE 115-a is not going to utilize the resources 215-b for transmission of pending data. In such cases, the detection procedure may include the UE 115-a monitoring for one or more OTA messages transmitted by the UE 115-a on at least a portion of the resources 215-a upon receiving the conditional grant 210. If the UE 115-b does not detect one or more OTA messages, the UE 115-b may determine that the UE 115-a is not going to utilize the resources 215-a and transmit the pending data over the resources 215-b.

In some examples, the OTA message for which the UE 115-b monitors for during the detection procedure and the way in which the resources 215 are arranged may change depending on the situation. In one example, the resources may be arranged such that resources 215-a come before resources 215-b in the time domain and the OTA message may be any data message transmitted by the UE 115-a. Upon receiving the conditional grant 210 from the base station 105-a, the UE 115-b may monitor for data messages transmitted by the UE 115-b during a timing offset between the resources 215-a and the resources 215-b. If the UE 115-b does not detect a data message during the timing offset, the UE 115-*b* may determine that the UE 115-*a* is not going to utilize the resources 215-*a* and transmit the pending data over the resources 215-*b*.

In another example, the resources may be arranged such that resources 215-*a* come before resources 215-*b* in the time domain and the OTA message may be specified as an LBT transmission. The timing offset between the resources 215-*a* and the resources 215-*b* may be based on CP extensions allocated to the UEs 115. In some examples, the base station 105-*a* may allocate an earlier CP extension to the UE 115-*a* than the UE 115-*b*. The difference between the CP extension allocated to the UE 115-*a* and the CP extension allocated to the UE 115-*b* may be the timing offset. Upon receiving the conditional grant 210 from the base station 105-*a*, the UE 115-*b* may monitor the channel according to an LBT setup procedure (e.g., compare the energy of the channel to an energy detection (ED) threshold) during the timing offset. If the UE 115-*b* determines that the UE 115-*a* is not going to utilize the resources 215-*a* based on the monitoring, the UE 115-*b* may transmit the pending data over the resources 215-*b*.

In another example, the resources may be arranged such that resources 215-*a* come before resources 215-*b* in the time domain and the OTA message may be specified as a DMRS sequence associated with the UE 115-*a*. The timing offset between the resources 215-*a* and the resources 215-*b* may be one slot. Upon receiving the conditional grant 210 from the base station 105-*a*, the UE 115-*b* may monitor for the DMRS sequence associated with the UE 115-*a* during the timing offset. If the UE 115-*b* does not detect the DMRS sequence associated with the UE 115-*a*, the UE 115-*b* may determine that the UE 115-*a* is not going to utilize the resources 215-*a* and transmit the pending data over the resources 215-*b*.

In another example, the base station 105-*a* may grant the UE 115-*a* with multiple sidelink transmission opportunities for a transport block. In such example, the resources 215-*a* may include a first set of resources for initial transmission of the transport block and a second set of resources for a retransmission of the transport block. The resources 215 may be arranged such that the first set of resource do not overlap the resources 215-*b* and come before the resources 215-*b* in time. In addition, the resources 215-*b* may overlap in time and frequency with the second set of resources. The OTA message, in this case, may be SCI associated with the UE 115-*a*. Upon receiving the conditional grant 210 from the base station 105-*a*, the UE 115-*b* may monitor the first set of resources for SCI associated with the UE 115-*a*. If the UE 115-*b* does not detect SCI associated with the UE 115-*a*, the UE 115-*b* may determine that the UE 115-*a* is not going to utilize the second set of resources and transmit the pending data over the resources 215-*b*.

In another example, the OTA message may be an early occupancy indication. In such example, the base station 105-*a* may grant the UE 115-*a* with additional resources for the early occupancy indication (e.g., via the proactive dynamic grant 205). That is, the resources 215-*a* may include a first set of resources for the early occupancy indication and a second set of resources for transmitting pending data, where the first set of resources come before the second set of resource in the time domain. In some examples, the resources 215-*b* may overlap in time and frequency with the second of resource, but not with the first set of resources. In one example, the first set of resources may include a dedicated physical sidelink feedback channel (PSFCH) resource if the UE 115-*a* or the UE 115-*b* are operating in accordance to sidelink. If the UE 115-*a* has pending data, it may transmit the early occupancy indication (e.g., an SRS) over the first set of resources. Upon receiving the conditional grant 210 from the base station 105-*a*, the UE 115-*b* may monitor the first set of resource for the early occupancy indication. If the UE 115-*b* does not detect the early occupancy indication, the UE 115-*b* may determine that the UE 115-*a* is not going to utilize the second set of resources for transmitting the pending data and transmit the pending data over the resources 215-*b*.

In some examples, the base station 105-*a* may grant the UEs 115 to transmit control signaling to the base station 105-*a* indicating whether the UEs 115 were able to utilize resources 215 for transmissions. For example, the base station 105-*a* may transmit a first grant to the UE 115-*a* indicating physical uplink control channel (PUCCH) resources to transmit a first message indicating whether it was able to transmit over the resources 215-*a* and the base station 105-*a* may transmit a second grant indicating PUCCH resources to transmit a second message indicating whether it was able to transmit over resources 215-*b*. In some examples, the UE 115-*a* and the UE 115-*b* may utilize orthogonal PUCCH resources to transmit the first message and the second message, respectively. The first message and the second message may also serve as an SR in the event that the UE 115-*a* or the UE 115-*b* was unable to transmit over the resources 215. Additionally or alternatively, the UE 115-*b* may receive a third grant to transmit a third message over PUCCH resources indicating whether its transmission over the resources 215-*b* was been blocked by a transmission by the UE 115-*a* (e.g., that the one or more conditions of the conditional grant 210 were satisfied). In some examples, the third message may serve as an SR in the event that the transmission by the UE 115-*b* was blocked by the UE 115-*a*.

In some examples, UEs 115 may receive proactive dynamic grants 205 and conditional grants 210 via multiple downlink control information (DCIs) or a single DCI. Using multiple DCIs, the base station 105-*a* may transmit a first DCI specified for the UE 115-*a* which includes the proactive dynamic grant 205 and may transmit a second DCI specified for the UE 115-*b* which include the conditional grant 210. Using a combo DCI, the base station 105-*a* may transmit a single DCI specified for the UE 115-*a* and the UE 115-*b* which includes the proactive dynamic grant 205 and the conditional grant 210. In some examples, the base station 105-*a* may transmit the single DCI if the UE 115-*a* and the UE 115-*b* have similar physical downlink control channel (PDCCH) aggregation levels. The single DCI may be scrambled by a group common random network temporary identifier (GC-RNTI) allocated to the UE 115-*a* and the UE 115-*b* such that both the UE 115-*a* and the UE 115-*b* may recognize and decode the single DCI. Using the techniques as described herein may allow UEs 115 to utilize resources allocated to other UEs 115 in the event that the other UEs 115 do not have pending data to transmit over the allocated resources resulting in a more efficient use of resources.

FIGS. 3A, 3B, 3C, and 3D illustrate examples of detection procedures 300 (e.g., a detection procedure 300-*a*, a detection procedure 300-*b*, a detection procedure 300-*c*, and a detection procedure 300-*d*) that support techniques for granting resources for IoT communications in accordance with aspects of the present disclosure. In some examples, the detection procedure 300-*a*, the detection procedure 300-*b*, the detection procedure 300-*c*, and the detection procedure 300-*d* may implement aspects of a wireless communications system 100 and a wireless communications system 200. For example, UEs 115 as described with reference to FIGS. 1 and 2 may utilize the detection procedure 300-*a*, the detection procedure 300-*b*, the detection procedure 300-*c*, and the detection procedure 300-*d* to determine whether grants (e.g., conditional grants) from the network are valid as described herein.

Figure 3A:
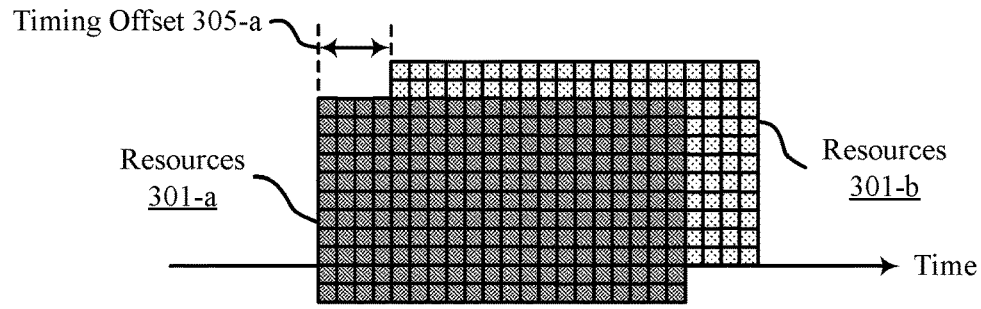
FIGS. 3A, 3B, 3C, 3D and 4A, 4B, and 4C illustrate examples of a detection procedure that supports techniques for granting resources for IoT communications in accordance with aspects of the present disclosure.

FIG. 3A illustrates an example of a detection procedure 300-*a* that supports techniques for granting resources for IoT communications in accordance with aspects of the present disclosure. In FIG. 3A, a first UE may receive a proactive dynamic grant indicating resources 301-*a* and a second UE may receive a conditional grant indicating resources 301-*b*. In some examples, the resources 301-*a* may overlap at least partially with the resources 301-*b* in a time domain and a frequency domain. Moreover, the resources 301-*a* may be located ahead of the resources 301-*b* in the time domain. For example, the resources 301-*b* may start at a later time than the resources 301-*b* as designated by a timing offset 305-*a*. The timing offset 305, in some examples, may be able to accommodate processing delay.

In some examples, the conditional grant may be valid upon the satisfaction of one or more conditions. That is, the second UE may transmit pending data over the resources 301-*b* upon satisfaction of the one or more conditions. In some examples, the second UE may determine whether the one or more conditions are satisfied by monitoring for one or more data messages from the first UE during the timing offset 305-*a*. If the second UE fails to detect one or more data message from the first UE during the timing offset 305-*a*, the second UE may determine that the one or more conditions of the conditional grant are met and transmit pending data over the resources 301-*b*. Alternatively, if the second UE does detect one or more data message from the UE 115 during the timing offset 305-*a*, the second UE may determine that the one or more conditions of the conditional grant are not met and may not transmit over the resources 301-*b*.

Figure 3B:
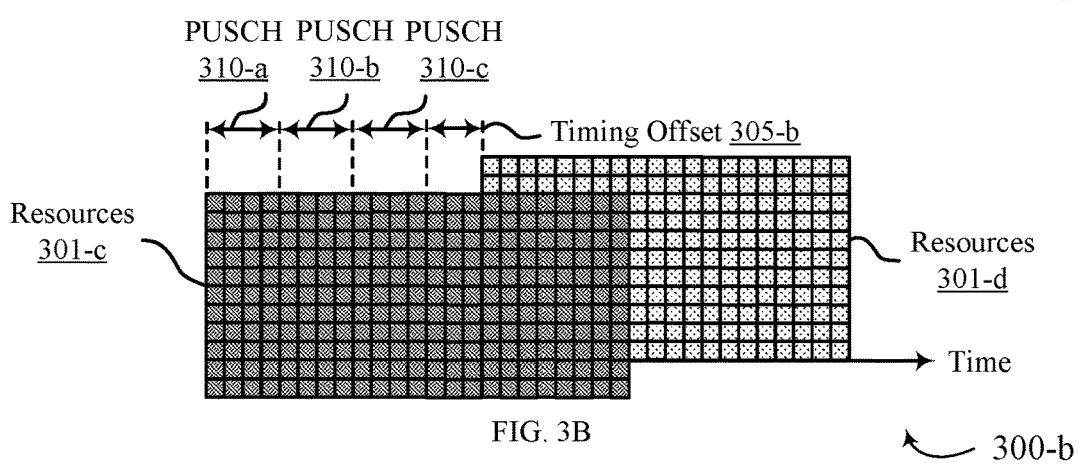

FIG. 3B illustrates an example of a detection procedure 300-*b* that supports techniques for granting resources for IoT communications in accordance with aspects of the present disclosure. In FIG. 3B, a first UE and a second UE may operate over an unlicensed frequency spectrum band (e.g., 5 GHz band or 6 GHz band) and as such, may communicate in accordance to LBT. That is, when the first UE or the second UE has pending data to transmit, the first UE or the second UE may monitor the channel for a time period, determine whether the channel is clear based on the monitoring, and transmit the pending data if the channel is clear (e.g., perform a channel clearance assessment (CCA)). In some examples, the first UE or the second UE may monitor the energy level of the channel during the time period and determine if the channel is clear by comparing the energy level of the channel to an energy detection (ED) threshold. In another example, the first UE or the second UE may monitor a signal strength (e.g., signal-to-noise ratio (SNR)) of signals transmitted during the time period and determine if the channel is clear by comparing the signal strength to a signal detect (SD) threshold.

As described herein, the first UE may receive a proactive dynamic grant indicating resources 301-*c* and a second UE may receive a conditional grant indicating resources 301-*d*. In some examples, the resources 301-*c* may overlap at least partially with the resources 301-*d* in a time domain and a frequency domain. Moreover, the resources 301-*c* may be located ahead of the resources 301-*d* in a time domain. For example, the resources 301-*d* may start at a later time than the resources 301-*c* as designated by a timing offset 305-*b*. The timing offset 305-*b* may correspond to a time for performing CCA. To achieve the time staggering as shown in FIG. 3B, the base station may allocate an earlier CP extension to the first UE than the second UE and the difference between the CP extensions of the respective UEs may be the timing offset 305-*b*. In some examples, the difference in CP extension between the first UE and the second UE may depend on a priority of the first UE and a priority of the second UE. For example, as the priority of the first UE increase, the difference in the CP extension may increase.

In some examples, the conditional grant may be valid upon the satisfaction of one or more conditions. That is, the second UE may transmit pending data over the resources 301-*d* upon satisfaction of the one or more conditions. In some examples, the second UE may determine if the one or more conditions are met by monitoring for CCA related parameters during the timing offset 305-*b*. That is, the second UE may monitor the energy level of the channel or the signal strength of signals transmitted by the first UE during the timing offset 305-*b*. As one example, if the second UE detects that the energy level of the channel is below the ED threshold during the timing offset 305-*b*, the second UE may determine that the one or more conditions of the conditional grant are met and transmit pending data over the resources 301-*d*. Alternatively, if the second UE detects that the energy level of the channel is above the ED threshold, the second UE may determine that the one or more conditions of the conditional grant are not met and may not transmit over the resources 301-*d*. Additionally, the first UE may have multiple starting points ahead of the starting point of the second UE. For example, the first UE may have three starting points before the starting point of the second UE. That is, the first resources 301-*d* may include resources of a physical uplink shared channel (PUSCH) 310-*a*, a PUSCH 310-*b*, and a PUSCH 310-*c*, where the resources of the PUSCH 310-*a*, the PUSCH 310-*b*, and the PUSCH 310-*b* do not overlap with resources 301-*d*.

Figure 3C:
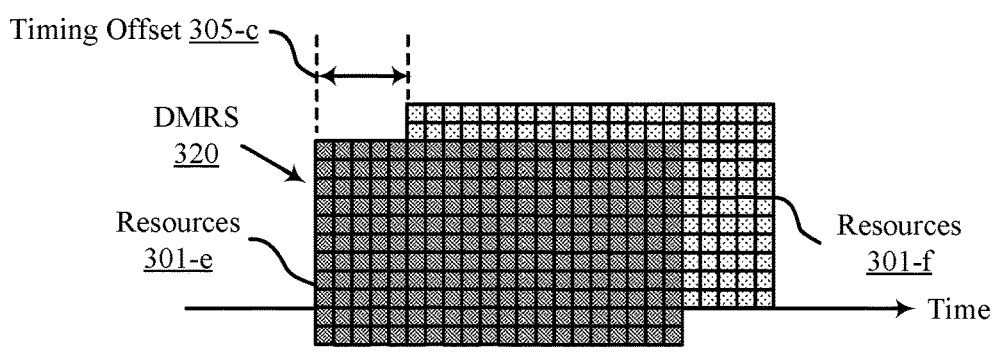

FIG. 3C illustrates an example of a detection procedure 300-*c* that supports techniques for granting resources for IoT communications in accordance with aspects of the present disclosure. In FIG. 3C, the first UE and the second UE may operate over a licensed frequency spectrum band. The first UE may receive a proactive dynamic grant indicating resources 301-*e* and a second UE may receive a conditional grant indicating resources 301-*f*. In some examples, the resources 301-*e* may overlap at least partially with the resources 301-*f* in a time domain and a frequency domain. Moreover, the resources 301-*e* may be located ahead of the resources 301-*f* in the time domain. For example, the resources 301-*f* may start at a later time than the resources 301-*e* as designated by a timing offset 305-*c*. The timing offset 305-*c*, in some examples, may be a slot. That is, the first UE may be granted with one slot ahead of that of the second UE.

In some examples, the conditional grant may be valid upon the satisfaction of one or more conditions. That is, the second UE may transmit pending data over the resources 301-*f* upon satisfaction of the one or more conditions. In some examples, the second UE may determine whether the one or more conditions are satisfied by monitoring for one or more DMRS sequences during the timing offset 305-*c*, where the DMRS sequence is associated with the first UE. If the second UE fails to detect one or more DMRS sequences associated with the first UE during the timing offset 305-*c*, the second UE may determine that the one or more conditions of the conditional grant are met and transmit pending data over the resources 301-*f*. Alternatively, if the second UE does detect one or more DMRS sequences associated with first UE during the timing offset 305-*c*, the second UE may determine that the one or more conditions of the conditional grant are not met and may not transmit over the resources 301-*f*.

Figure 3D:
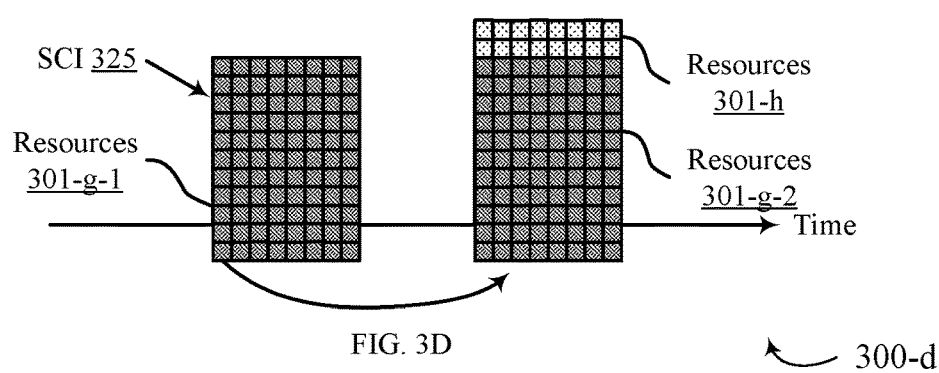

FIG. 3D illustrates an example of a detection procedure 300-*d* that supports techniques for granting resources for IoT communications in accordance with aspects of the present disclosure. In FIG. 3D, the first UE and the second UE may support sidelink communication. When communicating via sidelink, the first UE and the second UE may exchange SCI to inform each other of future transmissions. The first UE may receive a proactive dynamic grant indicating resources 301-*g* and a second UE may receive a conditional grant indicating resources 301-*h*. In some examples, the base station may grant the first UE with multiple sidelink transmission opportunities for a transport block (e.g., an initial transmission and up to two retransmissions). As such, the resource 301-*g* may include resources 301-*g*-1 and resources 301-*g*-1. The first UE may utilize the resources 301-*g*-1 for the initial transmission of the transport block and may utilize the resources 301-*g*-2 for retransmission of the transport block. In some examples, the base station may grant (e.g., via the conditional grant) for the second UE to transmit pending data at the first retransmission of the transport block. That is, the resources 301-*h* may overlap at least partially with the resources 301-*g*-2 in a time domain and a frequency domain.

In some examples, the conditional grant may be valid upon the satisfaction of one or more conditions. That is, the second UE may transmit pending data over the resources 301-*h* upon satisfaction of the one or more conditions. In some examples, the second UE may determine whether the one or more conditions are satisfied by monitoring for SCI associated with the first UE at the initial transmission of the transport block by the first UE. That is, the second UE may monitor resources 301-*g*-1 for SCI associated with the first UE. If the second UE fails to detect SCI associated with the first UE, the second UE may determine that the one or more conditions of the conditional grant are met and transmit pending data over the resources 301-*h*. Alternatively, if the second UE does detect SCI associated with the first UE, the second UE may determine that the one or more conditions of the conditional grant are not met and may not transmit over the resources 301-*h*.

Additionally, the second UE may determine whether the one or more conditions are satisfied by monitoring for a HARQ response towards the initial transmission of the transport block by the first UE. In some examples, the SCI associated with the first UE or the DCI carrying the conditional grant may indicate PSFCH resources to monitor for the HARQ response. If the second UE detects acknowledgement (ACK) feedback towards the initial transmission of the transport block by the first UE, the second UE may determine that the one or more conditions of the conditional grant are met and transmit pending data over the resources 301-*h*. Alternatively, if the second UE detects negative acknowledgement (NACK) feedback towards the initial transmission of the transport block by the first UE, the second UE may not determine that the one or more conditions of the conditional grant are not met and may not transmit over the resources 301-*h*.

Figure 4A:
Figure 4A:
Figure 4A:
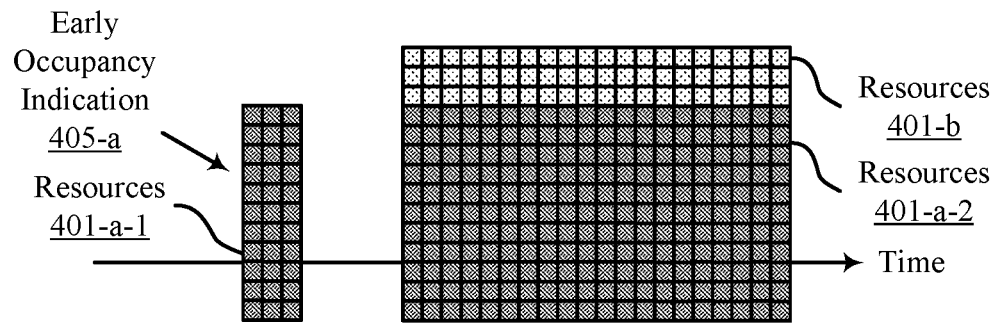
Figure 4B:
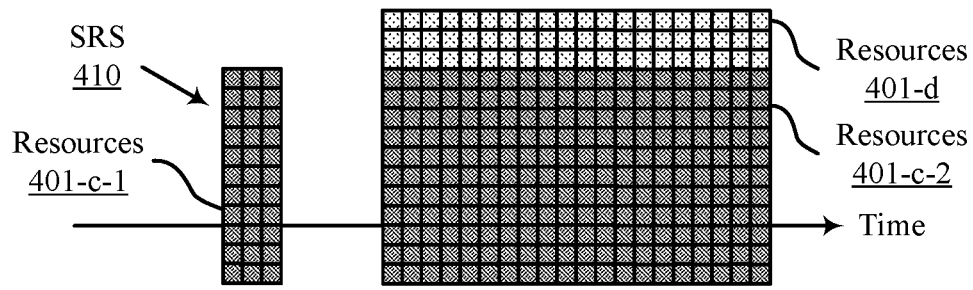
Figure 4C:
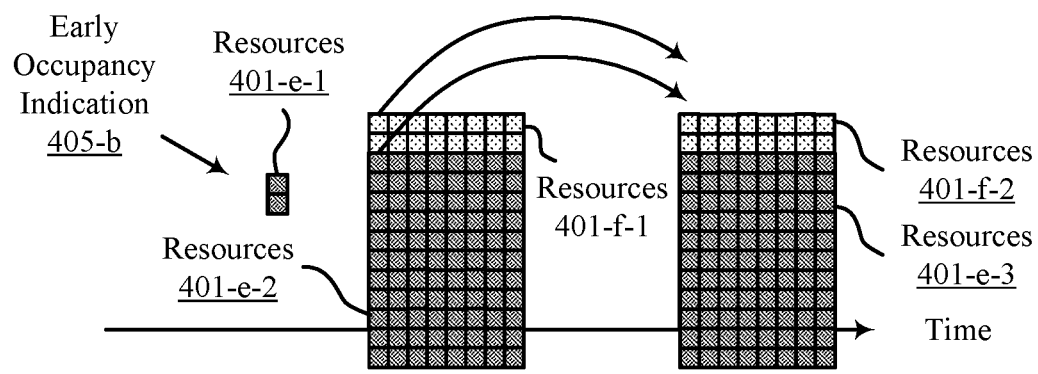

FIGS. 4A, 4B, and 4C illustrate examples of detection procedures 400 (e.g., a detection procedure 400-*a*, a detection procedure 400-*b*, and a detection procedure 400-*c*) that supports techniques for granting resources for IoT communications in accordance with aspects of the present disclosure. In some examples, the detection procedure 400-*a*, the detection procedure 400-*b*, and the detection procedure 400-*c* may implement aspects of a wireless communications system 100, a wireless communications system 200, and detection procedures 300. For examples, UEs 115 as described with reference to FIGS. 1 and 2 may utilize the detection procedure 400-*a*, the detection procedure 400-*b*, and the detection procedure 400-*c* to determine whether grants (e.g., conditional grants) from the network are valid as described herein.

FIG. 4A illustrates an example of a detection procedure 400-*a* that supports techniques for granting resources for IoT communications in accordance with aspects of the present disclosure. In FIG. 4A, the first UE may receive a proactive dynamic grant indicating resources 401-*a* and a second UE may receive a conditional grant indicating resources 401-*b*. In some examples, the base station may grant the first UE with additional resources to transmit an early occupancy indication 405-*a*. As such, the resource 401-*a* may include resources 401-*a*-1 and resources 401-*a*-2. The first UE may utilize the resources 401-*a*-1 for transmission of the early occupancy indication 405-*a* and may utilize the resources 401-*a*-2 for transmission of pending data. In some examples, the resources 401-*b* granted to the second UE and the resources 401-*a*-2 granted to the first UE may have the same starting point and may overlap at least partially in a time domain and a frequency domain.

In some examples, the conditional grant may be valid upon the satisfaction of one or more conditions. That is, the second UE may transmit pending data over the resources 401-*b* upon satisfaction of the one or more conditions. In some examples, the second UE may determine whether the one or more conditions are satisfied by monitoring for the early occupancy indication 405-*a* transmitted by the first UE. That is, the second UE may monitor resources 401-*a*-1 for the early occupancy indication 405-*a*. If the second UE fails to detect the early occupancy indication 405-*a*, the second UE may determine that the one or more conditions of the conditional grant are met and transmit pending data over the resources 401-*b*. Alternatively, if the second UE does detect the early occupancy indication 405-*a*, the second UE may determine that the one or more conditions of the conditional grant are not met and may not transmit over the resources 401-*b*.

FIG. 4B illustrates an example of a detection procedure 400-*b* that supports techniques for granting resources for IoT communications in accordance with aspects of the present disclosure. In FIG. 4B, the first UE may receive a proactive dynamic grant indicating resources 401-*c* and a second UE may receive a conditional grant indicating resources 401-*d*. In some examples, the base station may grant the first UE with additional resources to transmit an SRS 410. As such, the resource 401-*c* may include resources 401-*c*-1 and resources 401-*c*-2. The first UE may utilize the resources 401-*c*-1 for transmission of the SRS and may utilize the resources 401-*c*-2 for transmission of pending data. In some examples, the resources 401-*d* granted to the second UE and the resources 401-*c*-2 granted to the first UE may have the same starting point and may overlap at least partially in a time domain and a frequency domain.

In some examples, the conditional grant may be valid upon the satisfaction of one or more conditions. That is, the second UE may transmit pending data over the resources 401-*d* upon satisfaction of the one or more conditions. In some examples, the second UE may determine whether the one or more conditions are satisfied by monitoring for the SRS 410 transmitted by the first UE. That is, the second UE may monitor resources 401-a-1 for the SRS 410. If the second UE fails to detect the SRS 410, the second UE may determine that the one or more conditions of the conditional grant are met and transmit pending data over the resources 401-d. Alternatively, if the second UE does detect the SRS 410, the second UE may determine that the one or more conditions of the conditional grant are not met and may not transmit over the resources 401-d.

FIG. 4C illustrates an example of a detection procedure 400-c that supports techniques for granting resources for IoT communications in accordance with aspects of the present disclosure. In FIG. 4C, the first UE may receive a proactive dynamic grant indicating resources 401-e and a second UE may receive a conditional grant indicating resources 401-f. In some examples, first UE may have dedicated PSFCH resources to transmit an early occupancy indication 405-b. As such, the resource 401-e may include resources 401-e-1, resources 401-e-2, and resources 401-e-3. The resources 401-e-1 may include the dedicated PSFCH resources and the first UE may utilize the resources 401-e-1 for transmission of the early occupancy indication 405-b. Moreover, the first UE may utilize the resources 401-e-2 for transmission of pending data and the second UE may utilize the resources 4014-1 for transmission of pending data. In some examples, the first UE and the second UE may transmit SCI over the resources 401-e-2 and the resources 4014-1, respectively, to indicate future reservations (e.g., reservation of resources 401-e-3 and resources 401-e-2). The resources 401-e-2 and the resources 401-e-3 reserved by the first UE may have the same starting point as the resources 4014-1 and the resources 401-f-2 reserved by the second UE, respectively and may overlap at least partially in a time domain and a frequency domain.

In some examples, the conditional grant may be valid upon the satisfaction of one or more conditions. That is, the second UE may transmit pending data over the resources 4014-1 upon satisfaction of the one or more conditions. In some examples, the second UE may determine whether the one or more conditions are satisfied by monitoring the resources 401-e-1 for the early occupancy indication 405-b transmitted by the first UE. If the second UE fails to detect the early occupancy indication 405-b, the second UE may determine that the one or more conditions of the conditional grant are met and transmit pending data over the resources 4014-1. Alternatively, if the second UE does detect the early occupancy indication 405-b, the second UE may determine that the one or more conditions of the conditional grant are not met and may not transmit over the resources 4014-1.

Figure 5:
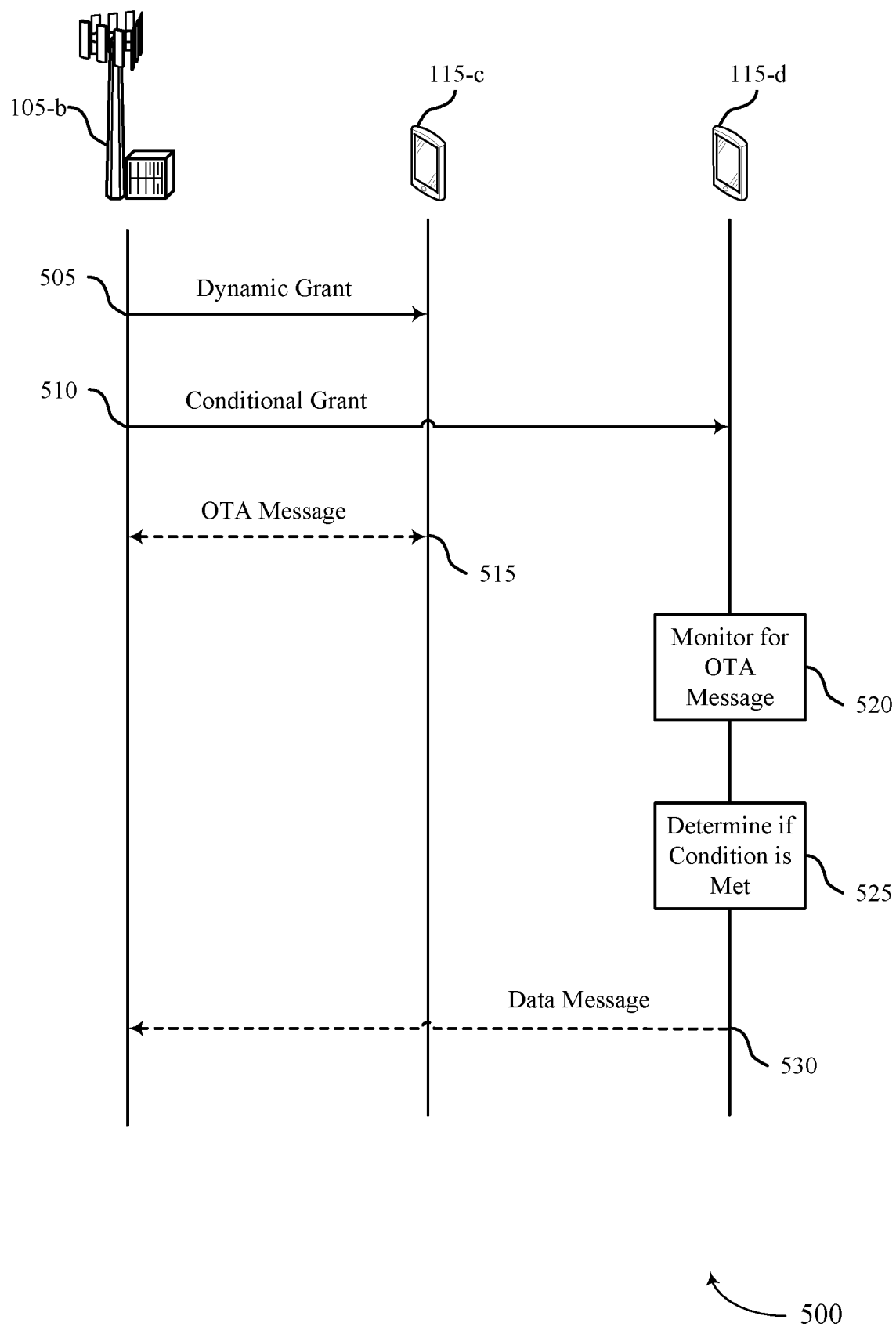
FIG. 5 illustrates an example of a process flow that supports techniques for granting resources for IoT communications in accordance with aspects of the present disclosure.

FIG. 5 illustrates an example of a process flow 500 that supports techniques for granting resources for IoT communications in accordance with aspects of the present disclosure. In some examples, the process flow 500 may implement or be implemented by aspects of a wireless communications system 100, a wireless communications system 200, detection procedures 300, and detection procedures 400. For example, the process flow 500 may be implemented by a base station 105-b, a UE 115-c, and a UE 115-d which may be examples of a base station 105 and UEs 115 as described with reference to FIGS. 1 and 2. Alternative examples of the following may be implemented, where some steps are performed in a different order then described or are not performed at all. In some cases, steps may include additional features not mentioned below, or further steps may be added.

At 505, the UE 115-c may receive a dynamic grant from the base station 105-b. The dynamic grant may schedule the UE 115-c to transmit pending data over a first set of resources. Additionally, the proactive dynamic grant may include a parameter which may allow the UE 115-c to skip the proactive dynamic grant if the UE 115-c does not have pending data to transmit. In some examples, the base station 105-b may transmit the parameter as a bit field.

At 510, the UE 115-d may receive a conditional grant from the base station 105-b. The conditional grant may schedule the UE 115-d to transmit pending data over a second set of resources conditional on completion of a detection procedure to monitor at least a portion of the first set of resources for one or more OTA messages. In some examples, the first set of resources may at least partially overlap the second set of resources (e.g., in time and frequency). The proactive dynamic grant and the conditional grant may be received as separate DCIs that are associated with one another (e.g., coupled DCI) or may be included in a single combo DCI. The single combo DCI may be scrambled by a GC-RNTI, where the GC-RNTI is allocated to both the UE 115-c and the UE 115-d. Using a combo DCI may save bits in time domain resource allocation (TDRA), frequency domain resource allocation (FDRA), and modulation and coding scheme (MCS) when compared to using coupled DCIs.

In some examples, the first set of resources and the second set of resources may be time staggered with respect to each other. For example, the starting point of the first set of resource may come prior to the starting point of the second set of resources. The time difference between the starting point of the first set of resources and the starting point of the second set of resources may be known as a time gap. In such examples, the OTA message may include one or more data messages transmitted by the UE 115-c, SCI transmitted by the UE 115-c, an LBT transmission, or a DMRS sequence allocated to the UE 115-c. In the case that the OTA message is an LBT transmission, the time gap may depend on a CP extension allocated to the UE 115-c and the UE 115-d, and in some examples, may include multiple transmission opportunities. In the case that the OTA is a DMRS sequence, the second set of resources may be aggregated uplink slots and in some examples, the time gap may span a single slot.

As another example, the first set of resources may include a first subset of resources and a second subset of resources, where the first subset of resources comes before the second subset of resources and the second subset of resources overlaps at least partially with the second set of resources. In such example, the OTA message may include an early occupancy indication (e.g., an SRS) transmitted by the UE 115-c over the first subset of resources (e.g., dedicated PSFCH resources).

At 515, the UE 115-c may have pending data and potentially transmit or receive a message indicating the UE 115-c's intention of transmitting the pending data over the first set of resources. That is, the UE 115-c may transmit or receive one or more OTA messages. For example, in the case of time-staggered resources, the UE 115-c may transmit one or more data messages over the first set of resources. As another example, the UE 115-c may transmit an early occupancy indication over the first subset of resources.

At 520, the UE 115-d may monitor for the one or more OTA messages as part of the detection procedure. In some examples, the UE 115-c may monitor for the one or more OTA messages during the time gap or the UE 115-c may monitor for the one or more OTA messages during the first subset of resources.

At 525, the UE 115-d may determine whether one or more conditions of the conditional grant are satisfied. In some examples, the one or more conditions may be considered satisfied if the UE 115-*d* fails to detect the one or more OTA messages at 520. Alternatively, the one or more conditions may be considered not satisfied if the UE 115-*d* does detect the one or more OTA messages at 520.

At 530, the UE 115-*d* may potentially transmit the pending data over the second set of resources. In some examples, the UE 115-*d* may transmit the pending data over the second set of resource if the one or more conditions of the conditional grant are satisfied and may not transmit the pending data if the one or more conditions of the conditional grant are not satisfied.

In some examples, one or both of the UE 115-*c* and the UE 115-*d* may receive a first grant from the base station 105-*b* to transmit an indication of whether they have transmitted over granted resources (e.g., the first set of resources or the second set of resources). Additionally, the UE 115-*c* may receive a second grant from the base station 105-*b* to transmit an indication of whether the UE 115-*c*'s transmission over the second set of resources was blocked by the UE 115-*c*'s transmission over the first set of resources. In some examples, these indications may serve as SRs.

Figure 6:
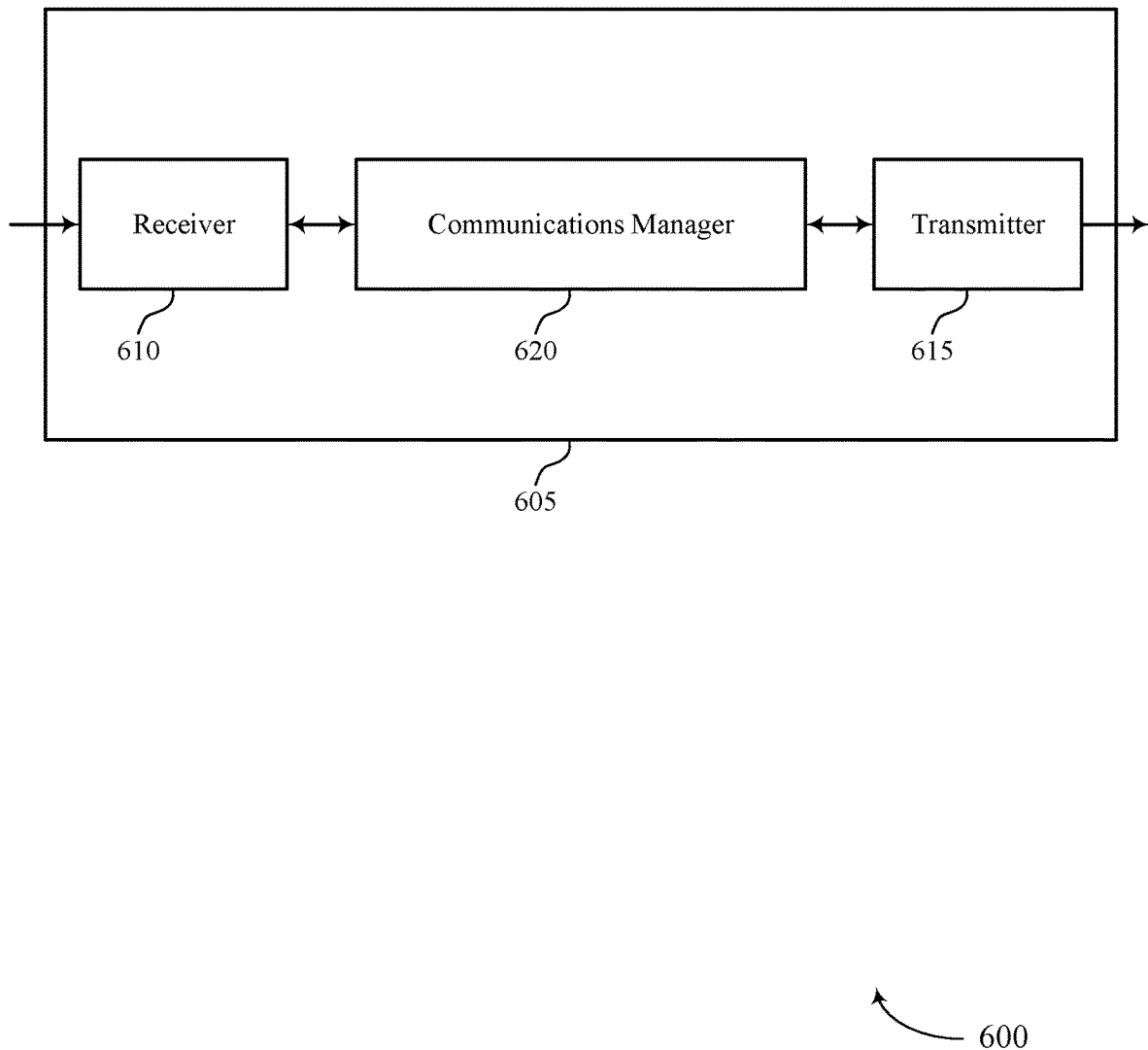
FIGS. 6 and 7 show block diagrams of devices that support techniques for granting resources for IoT communications in accordance with aspects of the present disclosure.

FIG. 6 shows a block diagram 600 of a device 605 that supports techniques for granting resources for IoT communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for granting resources for IoT communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for granting resources for IoT communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for granting resources for IoT communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a secondary UE in accordance with examples as disclosed herein. For example, the communications manager 620 may be configured as or otherwise support a means for receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The communications manager 620 may be configured as or otherwise support a means for monitoring, as part of the detection procedure, for the one or more OTA signals from the primary UE, the one or more OTA signals indicative of whether the second set of resources is used by the primary UE. The communications manager 620 may be configured as or otherwise support a means for determining, based on the monitoring, that one or more conditions for transmission of the one or more data messages have been satisfied via the detection procedure. The communications manager 620 may be configured as or otherwise support a means for transmitting the one or more data messages over the first set of resources based on the one or more conditions being satisfied.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources. Using the techniques as described herein may allow devices 605 (e.g., UEs) to utilize resources allocated to other devices 605 in the event that the other devices 605 do not have pending data to transmit over the allocated resources resulting in a more efficient use of resources.

Figure 7:
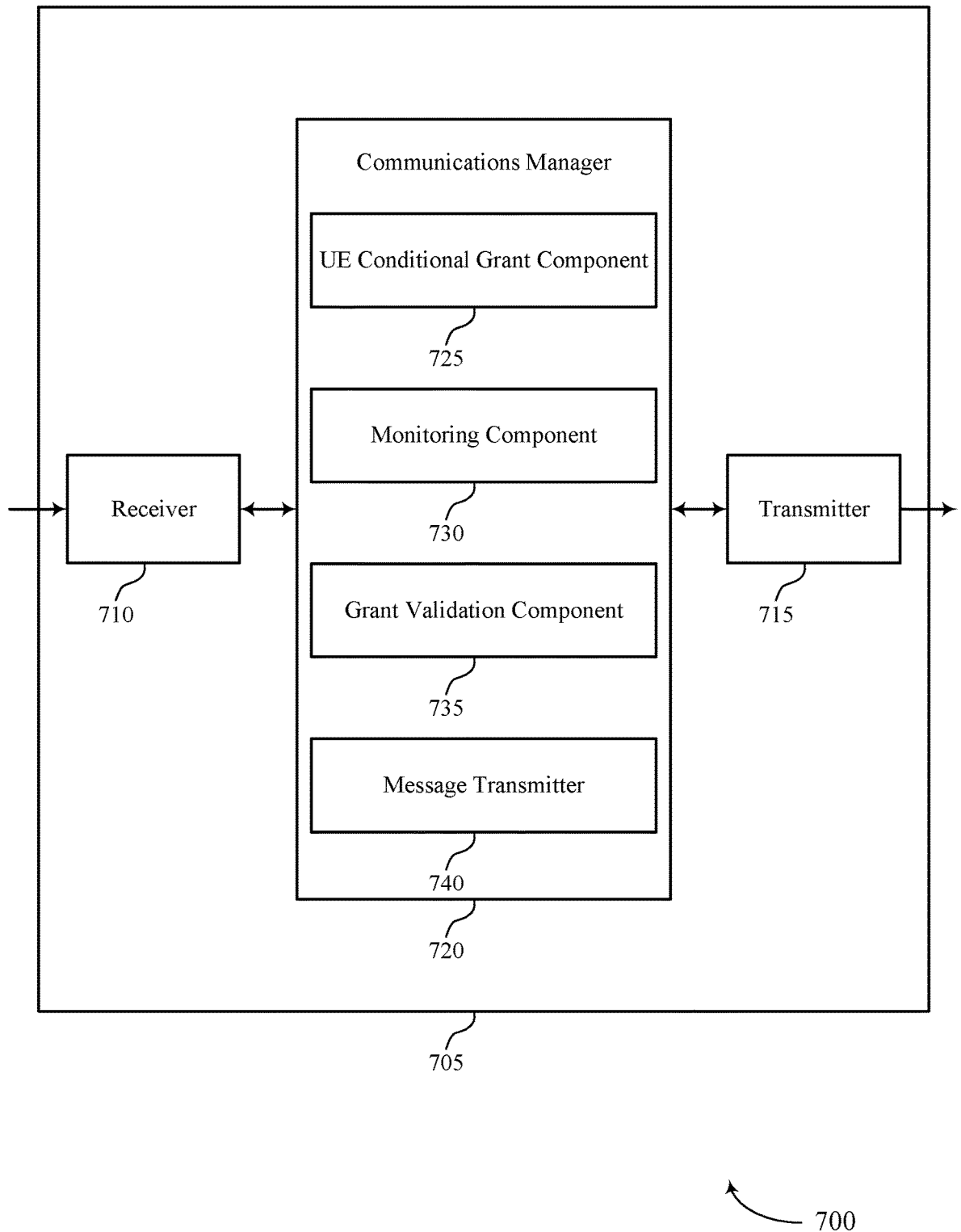

FIG. 7 shows a block diagram 700 of a device 705 that supports techniques for granting resources for IoT communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for granting resources for IoT communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for granting resources for IoT communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for granting resources for IoT communications as described herein. For example, the communications manager 720 may include a UE conditional grant component 725, a monitoring component 730, a grant validation component 735, a message transmitter 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a secondary UE in accordance with examples as disclosed herein. The UE conditional grant component 725 may be configured as or otherwise support a means for receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The monitoring component 730 may be configured as or otherwise support a means for monitoring, as part of the detection procedure, for the one or more OTA signals from the primary UE, the one or more OTA signals indicative of whether the second set of resources is used by the primary UE. The grant validation component 735 may be configured as or otherwise support a means for determining, based on the monitoring, that one or more conditions for transmission of the one or more data messages have been satisfied via the detection procedure. The message transmitter 740 may be configured as or otherwise support a means for transmitting the one or more data messages over the first set of resources based on the one or more conditions being satisfied.

Figure 8:
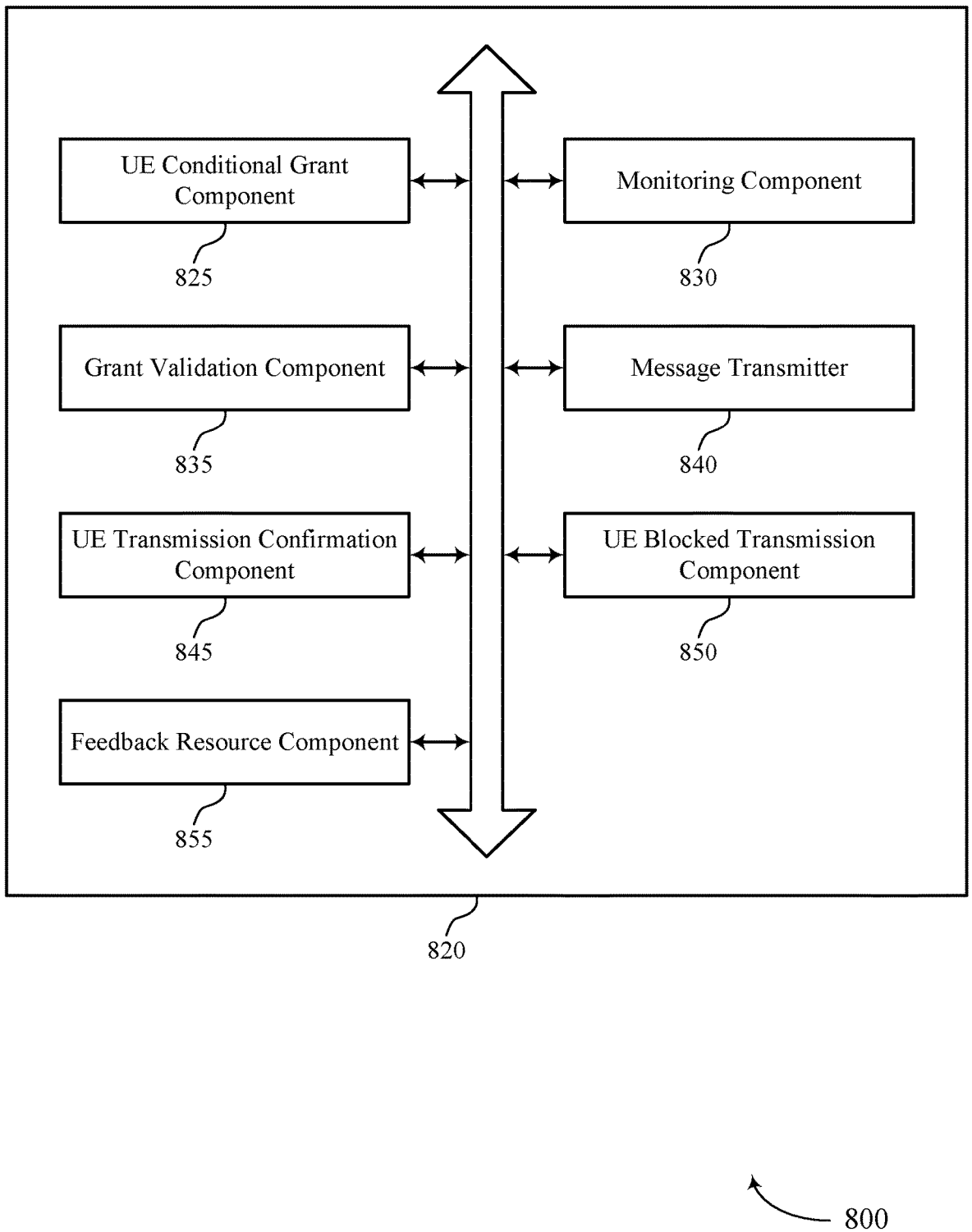
FIG. 8 shows a block diagram of a communications manager that supports techniques for granting resources for IoT communications in accordance with aspects of the present disclosure.

FIG. 8 shows a block diagram 800 of a communications manager 820 that supports techniques for granting resources for IoT communications in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for granting resources for IoT communications as described herein. For example, the communications manager 820 may include a UE conditional grant component 825, a monitoring component 830, a grant validation component 835, a message transmitter 840, a UE transmission confirmation component 845, a UE blocked transmission component 850, a feedback resource component 855, or any combination thereof. Each of these components may communicate, directly or indirectly, with one another (e.g., via one or more buses).

The communications manager 820 may support wireless communication at a secondary UE in accordance with examples as disclosed herein. The UE conditional grant component 825 may be configured as or otherwise support a means for receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The monitoring component 830 may be configured as or otherwise support a means for monitoring, as part of the detection procedure, for the one or more OTA signals from the primary UE, the one or more OTA signals indicative of whether the second set of resources is used by the primary UE. The grant validation component 835 may be configured as or otherwise support a means for determining, based on the monitoring, that one or more conditions for transmission of the one or more data messages have been satisfied via the detection procedure. The message transmitter 840 may be configured as or otherwise support a means for transmitting the one or more data messages over the first set of resources based on the one or more conditions being satisfied.

In some examples, to support determining that the one or more conditions have been satisfied, the grant validation component 835 may be configured as or otherwise support a means for failing to detect the one or more OTA signals from the primary UE.

In some examples, to support monitoring for the one or more OTA signals from the primary UE, the monitoring component 830 may be configured as or otherwise support a means for monitoring, as part of the detection procedure, during a time gap that extends from a beginning of the second set of resources and a subsequent beginning of the first set of resources.

In some examples, to support monitoring during the time gap, the monitoring component 830 may be configured as or otherwise support a means for monitoring the second set of resources during the time gap for the one or more OTA signals by the primary UE, where the one or more conditions are satisfied via the detection procedure upon failure by the secondary UE to detect the one or more OTA signals by the primary UE during the time gap.

In some examples, to support monitoring during the time gap, the monitoring component 830 may be configured as or otherwise support a means for monitoring the second set of resources for an LBT transmission during the time gap, where the time gap is defined by a CP extension for use by the primary UE to transmit the LBT transmission, where the one or more conditions are satisfied via the detection procedure upon failure by the secondary UE to detect an energy level during the time gap that is above a threshold.

In some examples, to support monitoring during the time gap, the monitoring component 830 may be configured as or otherwise support a means for monitoring the second set of resources during the time gap for the one or more OTA signals by the primary UE, where the time gap includes multiple transmission opportunities for the primary UE, where the one or more conditions are satisfied via the detection procedure upon failure by the secondary UE to detect any of the one or more OTA signals by the primary UE during the time gap.

In some examples, to support monitoring during the time gap, the monitoring component 830 may be configured as or otherwise support a means for monitoring the second set of resources during the time gap for one or more DMRS sequences associated with the primary UE, where the second set of resources are aggregated uplink slots and the time gap is at least one slot in duration, where the one or more conditions are satisfied via the detection procedure upon failure by the secondary UE to detect the one or more DMRS sequences during the time gap.

In some examples, to support monitoring during the time gap, the monitoring component 830 may be configured as or otherwise support a means for monitoring the second set of resources during the time gap for a SCI message by the primary UE, where the one or more conditions are satisfied via the detection procedure upon failure by the secondary UE to detect the SCI message during the time gap.

In some examples, to support monitoring during the time gap, the monitoring component 830 may be configured as or otherwise support a means for monitoring the second set of resources during the time gap for both a SCI message by the primary UE and an ACK feedback message associated with the SCI message, where the one or more conditions are satisfied via the detection procedure upon detection by the secondary UE of the ACK feedback message during the time gap.

In some examples, the feedback resource component 855 may be configured as or otherwise support a means for determining a resource to monitor for the ACK feedback message by either decoding the SCI message or through the first grant.

In some examples, to support monitoring for the one or more OTA signals from the primary UE, the monitoring component 830 may be configured as or otherwise support a means for monitoring, as part of the detection procedure, for an early occupancy indication transmitted by the primary UE prior in time to both the first set of resources and the second set of resources.

In some examples, to support monitoring for the early occupancy indication, the monitoring component 830 may be configured as or otherwise support a means for monitoring for an SRS from the primary UE, where the one or more conditions are satisfied via the detection procedure upon failure by the secondary UE to detect the SRS as the early occupancy indication from the primary UE.

In some examples, to support monitoring for the early occupancy indication, the monitoring component 830 may be configured as or otherwise support a means for monitoring a sidelink feedback channel resource for the early occupancy indication from the primary UE, where the one or more conditions are satisfied via the detection procedure upon failure based on a content of the sidelink feedback channel resource.

In some examples, the UE transmission confirmation component 845 may be configured as or otherwise support a means for receiving, via the first grant, a first uplink control channel resource for transmission by the secondary UE of a first indication confirming transmission of the one or more data messages over the first set of resources, where the second grant also includes a second uplink control channel resource for transmission by the primary UE of a second indication confirming transmission over the second set of resources. In some examples, the first indication by the secondary UE is an SR for retransmission of the one or more data messages.

In some examples, the UE blocked transmission component 850 may be configured as or otherwise support a means for receiving, via the first grant, a first uplink control channel resource for transmission by the secondary UE of a message indicating whether the one or more conditions are satisfied.

In some examples, to support receiving the first grant, the UE conditional grant component 825 may be configured as or otherwise support a means for receiving a DCI message that includes both the first grant and the second grant.

In some examples, the DCI message is scrambled by a GC-RNTI that is allocated to at least the secondary UE and the primary UE as supporting non-provisioning proactive dynamic grants and that have downlink control channel aggregation levels that are within common thresholds.

Figure 9:
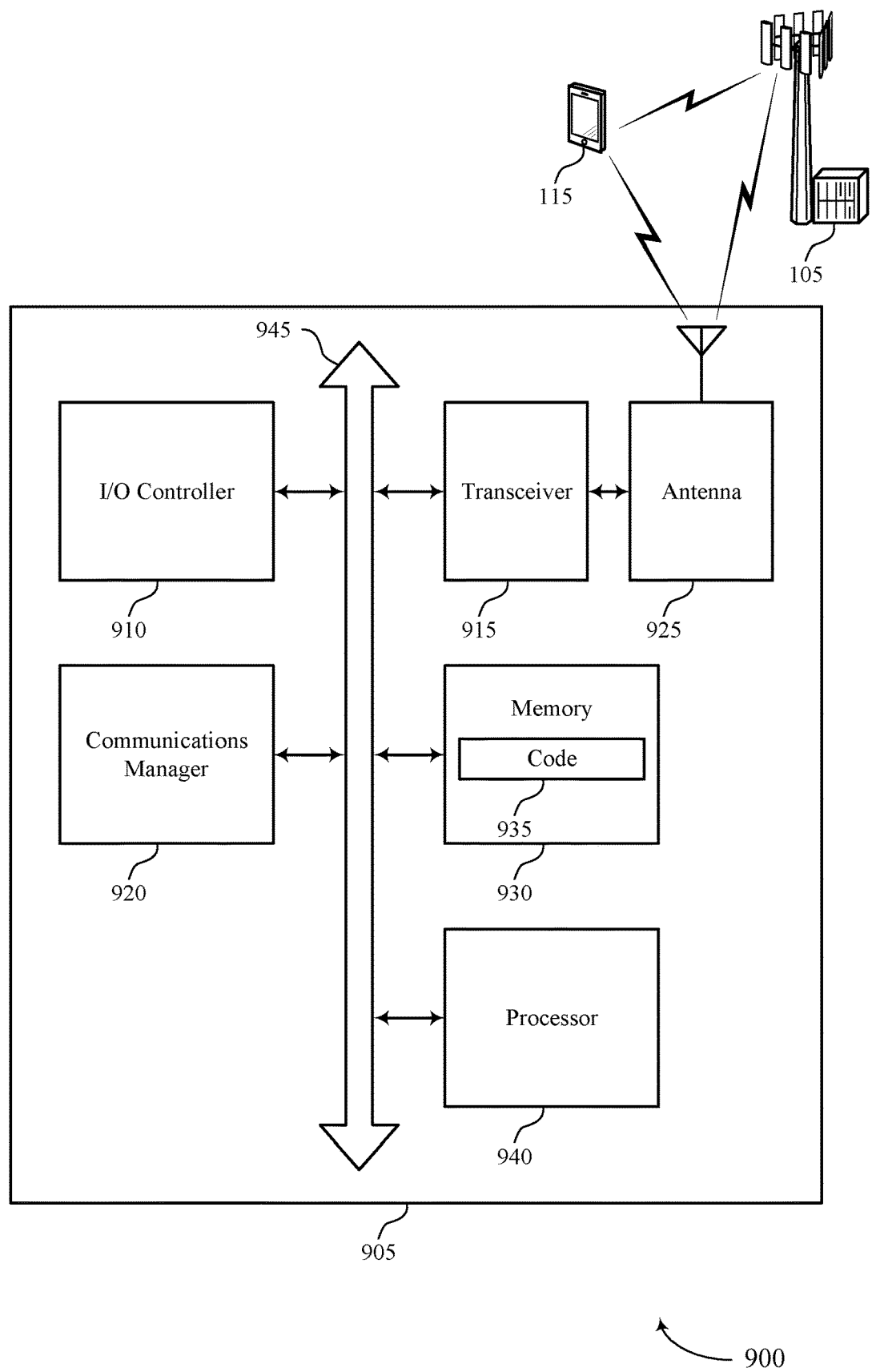
FIG. 9 shows a diagram of a system including a device that supports techniques for granting resources for IoT communications in accordance with aspects of the present disclosure.

FIG. 9 shows a diagram of a system 900 including a device 905 that supports techniques for granting resources for IoT communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for granting resources for IoT communications). For example, the device 905 or a component of the device 905 may include a processor 940 and memory 930 coupled to the processor 940, the processor 940 and memory 930 configured to perform various functions described herein.

The communications manager 920 may support wireless communication at a secondary UE in accordance with examples as disclosed herein. For example, the communications manager 920 may be configured as or otherwise support a means for receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The communications manager 920 may be configured as or otherwise support a means for monitoring, as part of the detection procedure, for the one or more OTA signals from the primary UE, the one or more OTA signals indicative of whether the second set of resources is used by the primary UE. The communications manager 920 may be configured as or otherwise support a means for determining, based on the monitoring, that one or more conditions for transmission of the one or more data messages have been satisfied via the detection procedure. The communications manager 920 may be configured as or otherwise support a means for transmitting the one or more data messages over the first set of resources based on the one or more conditions being satisfied.

By including or configuring the communications manager 920 in accordance with examples as described herein, the device 905 may support techniques for reduced latency and improved utilization of processing capability. By utilizing a proactive dynamic grants for scheduling transmissions, devices 905 may not transmit an SR to the network as is done with other dynamic grants thereby decreasing latency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for granting resources for IoT communications as described herein, or the processor 940 and the memory 930 may be otherwise configured to perform or support such operations.

Figure 10:
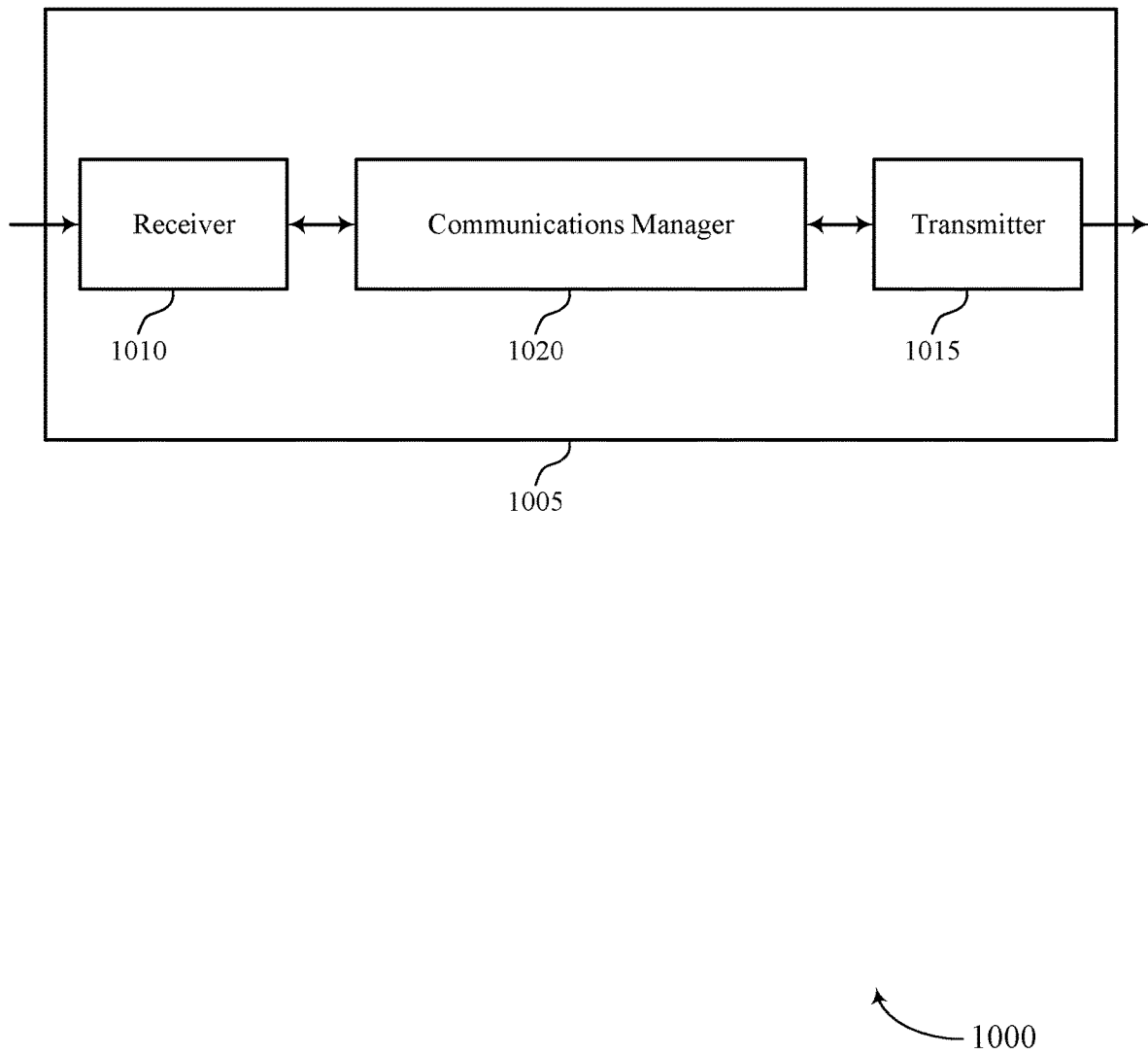
FIGS. 10 and 11 show block diagrams of devices that support techniques for granting resources for IoT communications in accordance with aspects of the present disclosure.

FIG. 10 shows a block diagram 1000 of a device 1005 that supports techniques for granting resources for IoT communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for granting resources for IoT communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for granting resources for IoT communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for granting resources for IoT communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The communications manager 1020 may be configured as or otherwise support a means for transmitting the second grant to the primary UE, the second grant including a parameter indicating that transmission by the primary UE using the second set of resources is optional.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
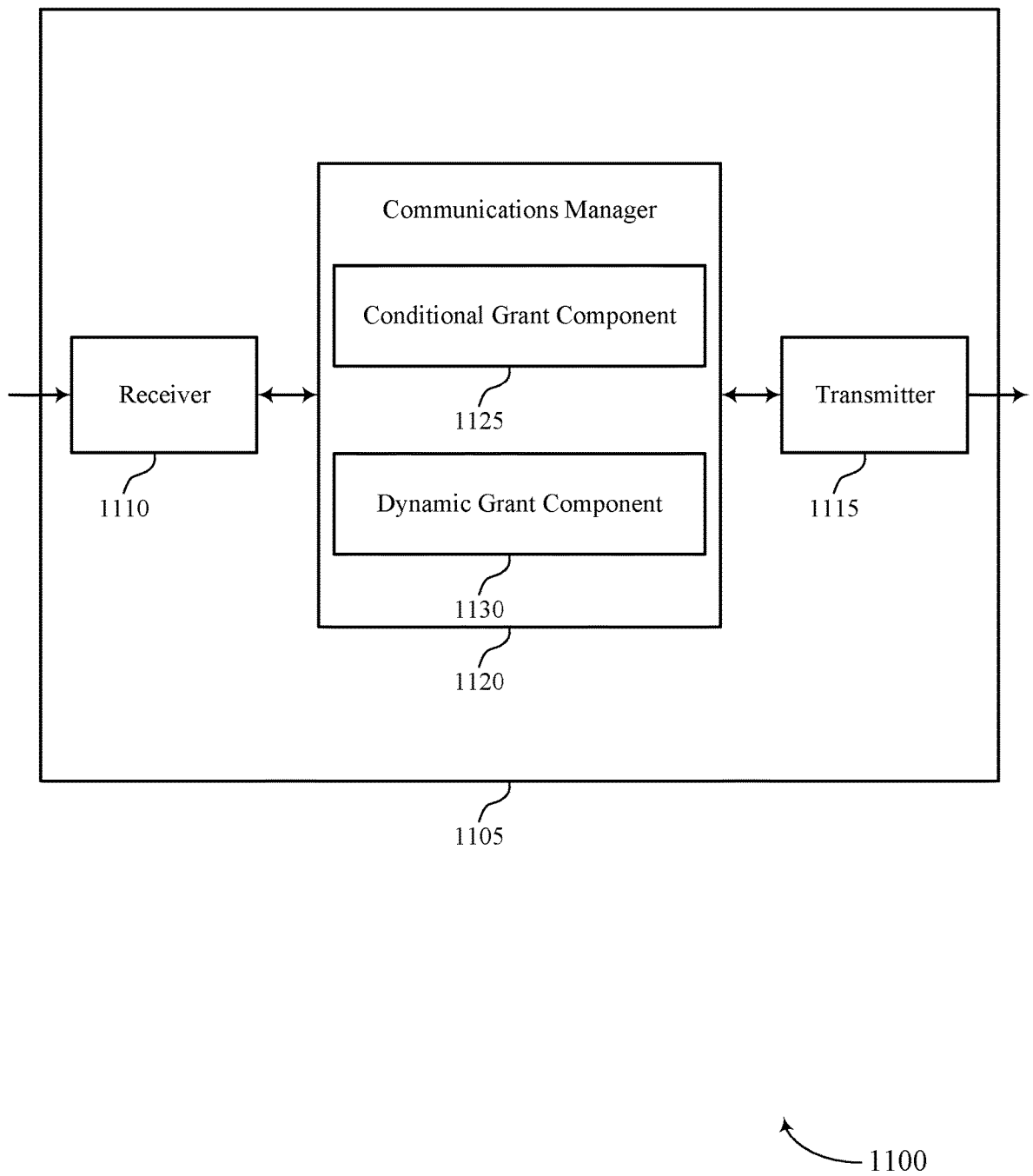

FIG. 11 shows a block diagram 1100 of a device 1105 that supports techniques for granting resources for IoT communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for granting resources for IoT communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for granting resources for IoT communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for granting resources for IoT communications as described herein. For example, the communications manager 1120 may include a conditional grant component 1125 a dynamic grant component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The conditional grant component 1125 may be configured as or otherwise support a means for transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The dynamic grant component 1130 may be configured as or otherwise support a means for transmitting the second grant to the primary UE, the second grant including a parameter indicating that transmission by the primary UE using the second set of resources is optional.

Figure 12:
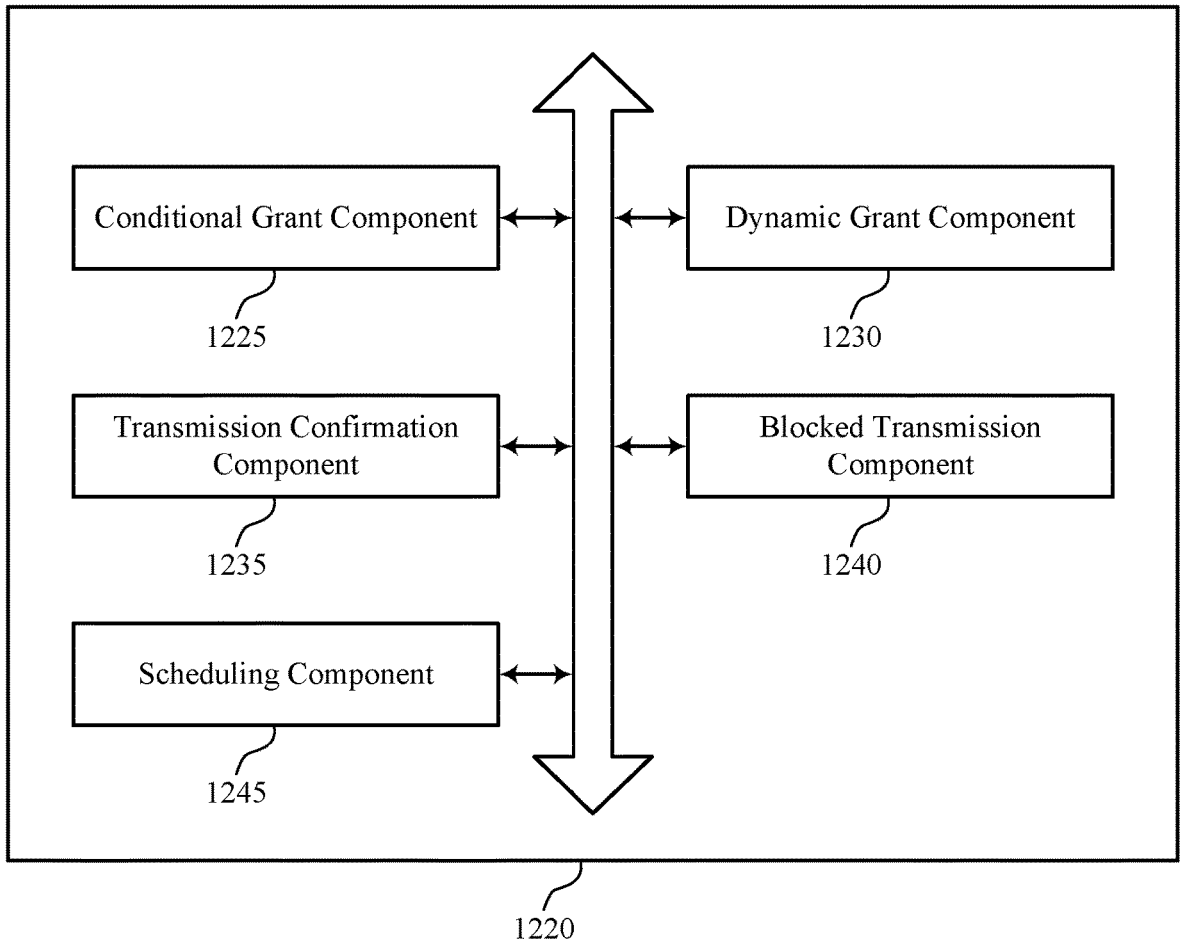
FIG. 12 shows a block diagram of a communications manager that supports techniques for granting resources for IoT communications in accordance with aspects of the present disclosure.

FIG. 12 shows a block diagram 1200 of a communications manager 1220 that supports techniques for granting resources for IoT communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for granting resources for IoT communications as described herein. For example, the communications manager 1220 may include a conditional grant component 1225, a dynamic grant component 1230, a transmission confirmation component 1235, a blocked transmission component 1240, a scheduling component 1245, or any combination thereof. Each of these components may communicate, directly or indirectly, with one another (e.g., via one or more buses).

The communications manager 1220 may support wireless communication at a base station in accordance with examples as disclosed herein. The conditional grant component 1225 may be configured as or otherwise support a means for transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The dynamic grant component 1230 may be configured as or otherwise support a means for transmitting the second grant to the primary UE, the second grant including a parameter indicating that transmission by the primary UE using the second set of resources is optional.

In some examples, to support transmitting the second grant to the primary UE, the dynamic grant component 1230 may be configured as or otherwise support a means for transmitting the parameter as a bit field which indicates that use of the second set of resources by the primary UE is based on whether the primary UE has content to transmit during the second set of resources.

In some examples, to support transmitting the first grant for conditional transmission of the one or more data messages, the conditional grant component 1225 may be configured as or otherwise support a means for transmitting the first grant as a conditional grant that is conditional on the secondary UE failing to detect, via the detection procedure, use of the second set of resources by the primary UE.

In some examples, a time gap extends from a beginning of the second set of resources and a subsequent beginning of the first set of resources.

In some examples, to support transmitting the first grant for conditional transmission of the one or more data messages, the conditional grant component 1225 may be configured as or otherwise support a means for transmitting the first grant as a conditional grant that is conditional on the secondary UE failing to detect, via the detection procedure, one or more OTA signals by the primary UE during the time gap.

In some examples, to support transmitting the first grant for conditional transmission of the one or more data messages, the conditional grant component 1225 may be configured as or otherwise support a means for transmitting the first grant as a conditional grant that is conditional on the secondary UE failing to detect, via the detection procedure, an LBT transmission by the primary UE during the time gap, where the time gap is defined by a CP extension for use by the primary UE to transmit the LBT transmission.

In some examples, the time gap includes multiple transmission opportunities for the primary UE. In some examples, the second set of resources are aggregated uplink slots and the time gap is at least one slot in duration.

In some examples, the transmission confirmation component 1235 may be configured as or otherwise support a means for transmitting, via the first grant, a first uplink control channel resource for use by the secondary UE to transmit a first indication confirming transmission of the one or more data messages over the first set of resources. In some examples, the transmission confirmation component 1235 may be configured as or otherwise support a means for transmitting, via the second grant, a second uplink control channel resource for use by the primary UE to transmit a second indication confirming transmission over the second set of resources.

In some examples, the scheduling component 1245 may be configured as or otherwise support a means for receiving the first indication from the secondary UE via an SR for retransmission of the one or more data messages.

In some examples, the blocked transmission component 1240 may be configured as or otherwise support a means for transmitting, via the first grant, a first uplink control channel resource for use by the secondary UE to transmit a message indicating whether one or more conditions associated with the conditional transmission of the one or more data messages over the first set of resources are satisfied. In some examples, the first grant and the second grant are transmitted in a same DCI message.

In some examples, the DCI message is scrambled by a GC-RNTI that is allocated to at least the secondary UE and the primary UE as supporting non-provisioning proactive dynamic grants and that have downlink control channel aggregation levels that are within common thresholds.

Figure 13:
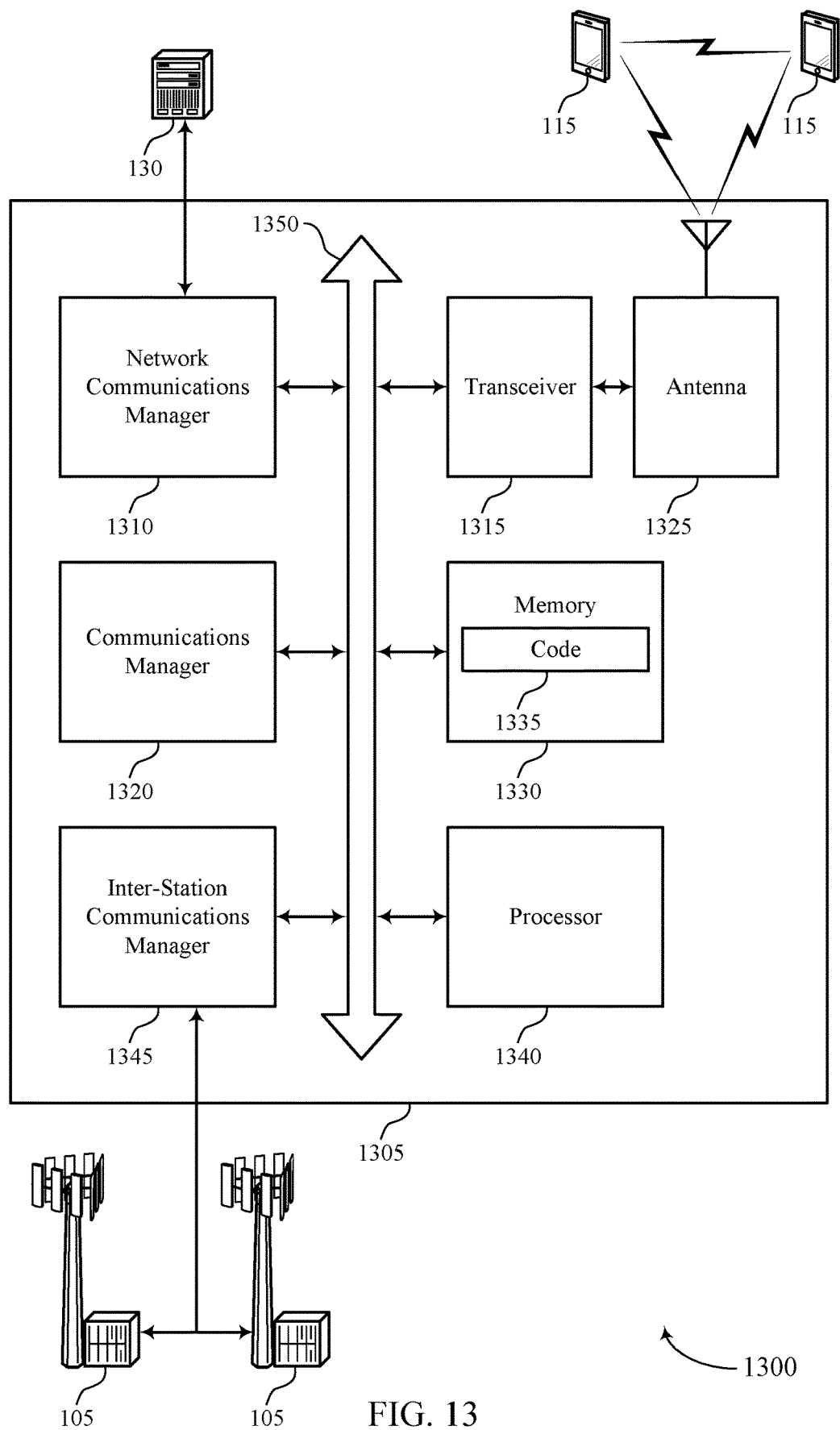
FIG. 13 shows a diagram of a system including a device that supports techniques for granting resources for IoT communications in accordance with aspects of the present disclosure.

FIG. 13 shows a diagram of a system 1300 including a device 1305 that supports techniques for granting resources for IoT communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for granting resources for IoT communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The communications manager 1320 may be configured as or otherwise support a means for transmitting the second grant to the primary UE, the second grant including a parameter indicating that transmission by the primary UE using the second set of resources is optional.

By including or configuring the communications manager 1320 in accordance with examples as described herein, the device 1305 may support techniques for reduced latency and more efficient utilization of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for granting resources for IoT communications as described herein, or the processor 1340 and the memory 1330 may be otherwise configured to perform or support such operations.

Figure 14:
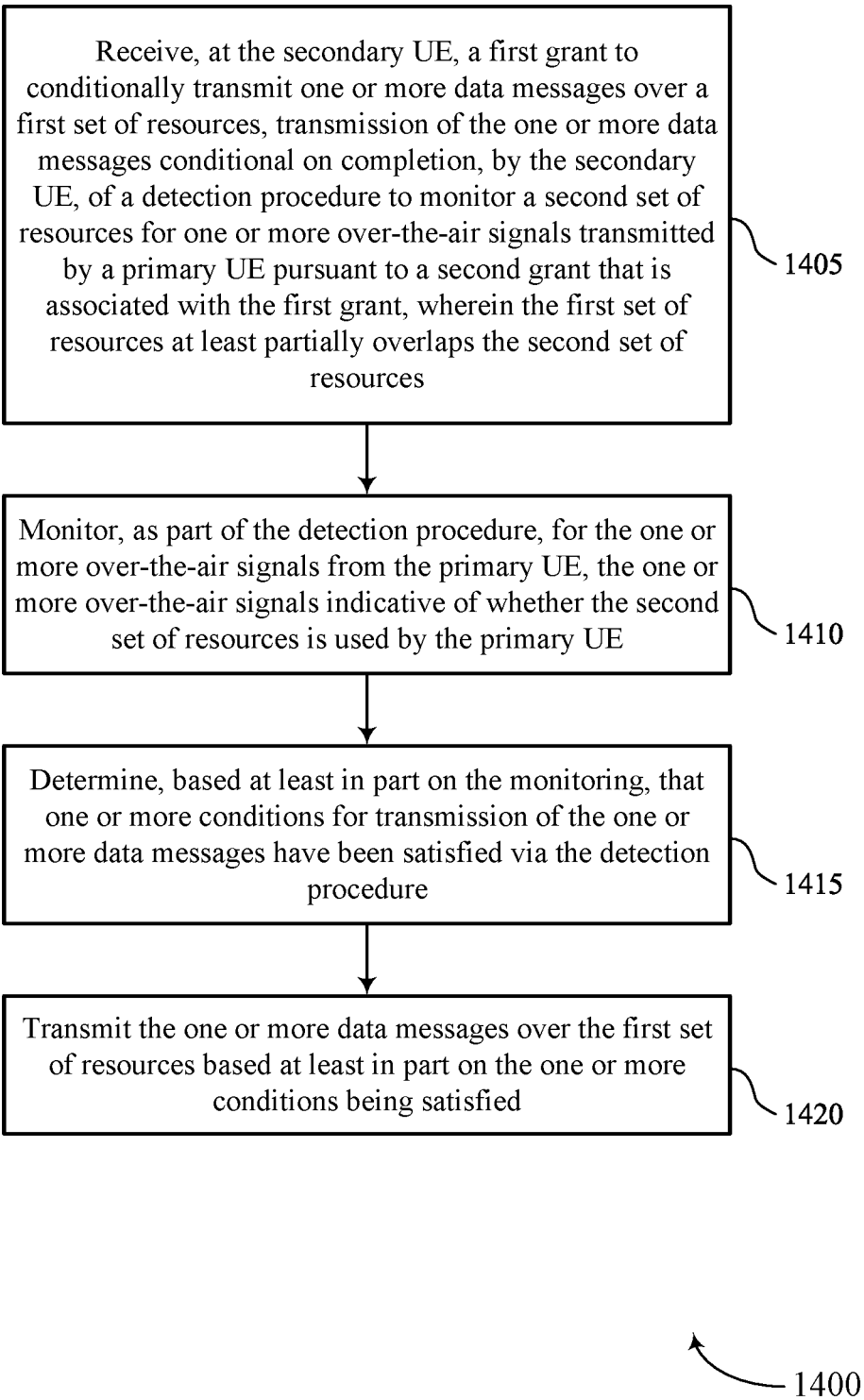
FIGS. 14 through 19 show flowcharts illustrating methods that support techniques for granting resources for IoT communications in accordance with aspects of the present disclosure.

FIG. 14 shows a flowchart illustrating a method 1400 that supports techniques for granting resources for IoT communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The operations of 1405 may be performed in accordance with examples as disclosed herein. In some examples, aspects of the operations of 1405 may be performed by a UE conditional grant component 825 as described with reference to FIG. 8.

At 1410, the method may include monitoring, as part of the detection procedure, for the one or more OTA signals from the primary UE, the one or more OTA signals indicative of whether the second set of resources is used by the primary UE. The operations of 1410 may be performed in accordance with examples as disclosed herein. In some examples, aspects of the operations of 1410 may be performed by a monitoring component 830 as described with reference to FIG. 8.

At 1415, the method may include determining, based on the monitoring, that one or more conditions for transmission of the one or more data messages have been satisfied via the detection procedure. The operations of 1415 may be performed in accordance with examples as disclosed herein. In some examples, aspects of the operations of 1415 may be performed by a grant validation component 835 as described with reference to FIG. 8.

At 1420, the method may include transmitting the one or more data messages over the first set of resources based on the one or more conditions being satisfied. The operations of 1420 may be performed in accordance with examples as disclosed herein. In some examples, aspects of the operations of 1420 may be performed by a message transmitter 840 as described with reference to FIG. 8.

Figure 15:
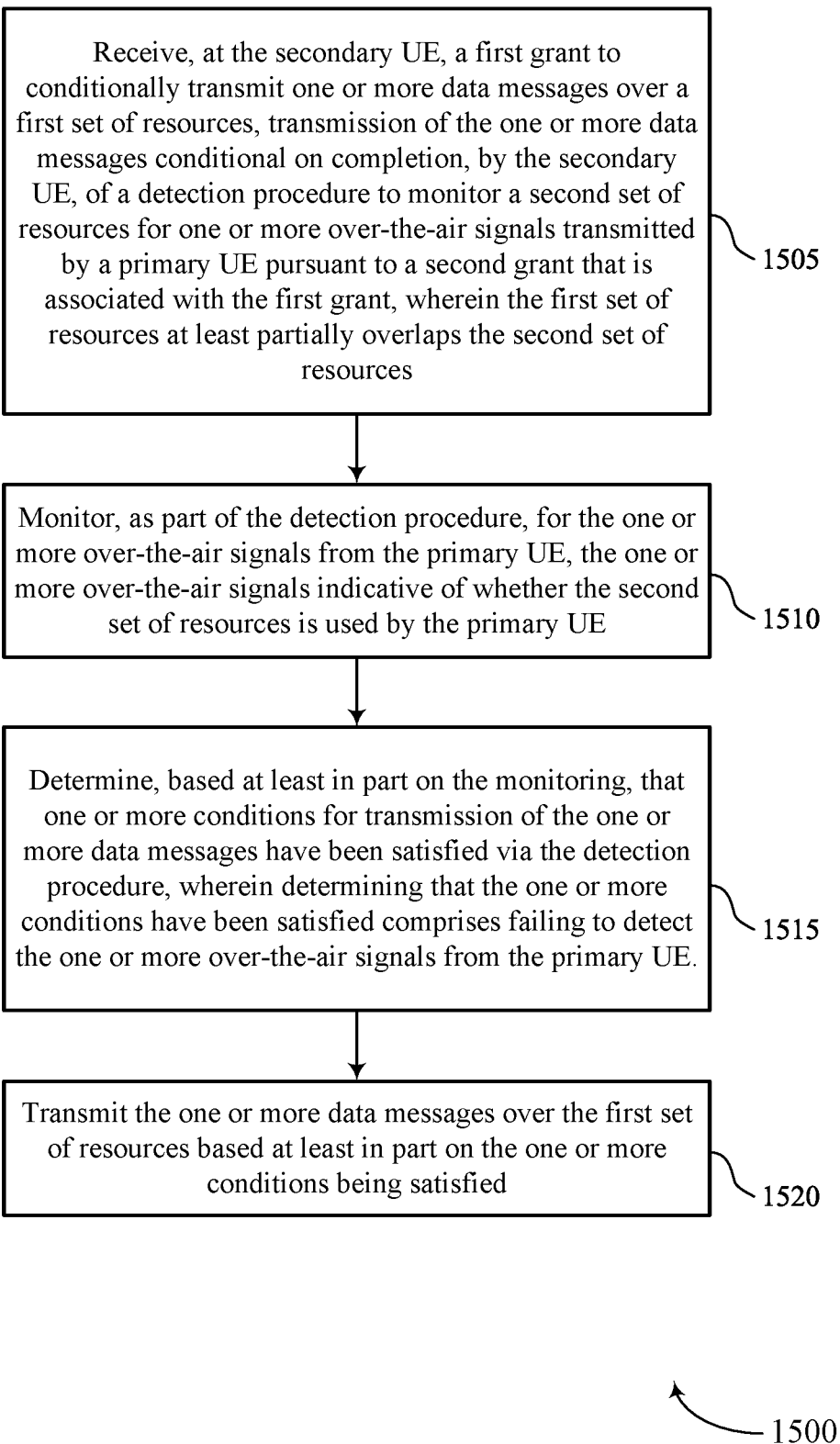

FIG. 15 shows a flowchart illustrating a method 1500 that supports techniques for granting resources for IoT communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The operations of 1505 may be performed in accordance with examples as disclosed herein. In some examples, aspects of the operations of 1505 may be performed by a UE conditional grant component 825 as described with reference to FIG. 8.

At 1510, the method may include monitoring, as part of the detection procedure, for the one or more OTA signals from the primary UE, the one or more OTA signals indicative of whether the second set of resources is used by the primary UE. The operations of 1510 may be performed in accordance with examples as disclosed herein. In some examples, aspects of the operations of 1510 may be performed by a monitoring component 830 as described with reference to FIG. 8.

At 1515, the method may include determining, based on the monitoring, that one or more conditions for transmission of the one or more data messages have been satisfied via the detection procedure, where determining that the one or more conditions have been satisfied includes failing to detect the one or more OTA signals from the primary UE. The operations of 1515 may be performed in accordance with examples as disclosed herein. In some examples, aspects of the operations of 1515 may be performed by a grant validation component 835 as described with reference to FIG. 8.

At 1520, the method may include transmitting the one or more data messages over the first set of resources based on the one or more conditions being satisfied. The operations of 1520 may be performed in accordance with examples as disclosed herein. In some examples, aspects of the operations of 1520 may be performed by a message transmitter 840 as described with reference to FIG. 8.

Figure 16:
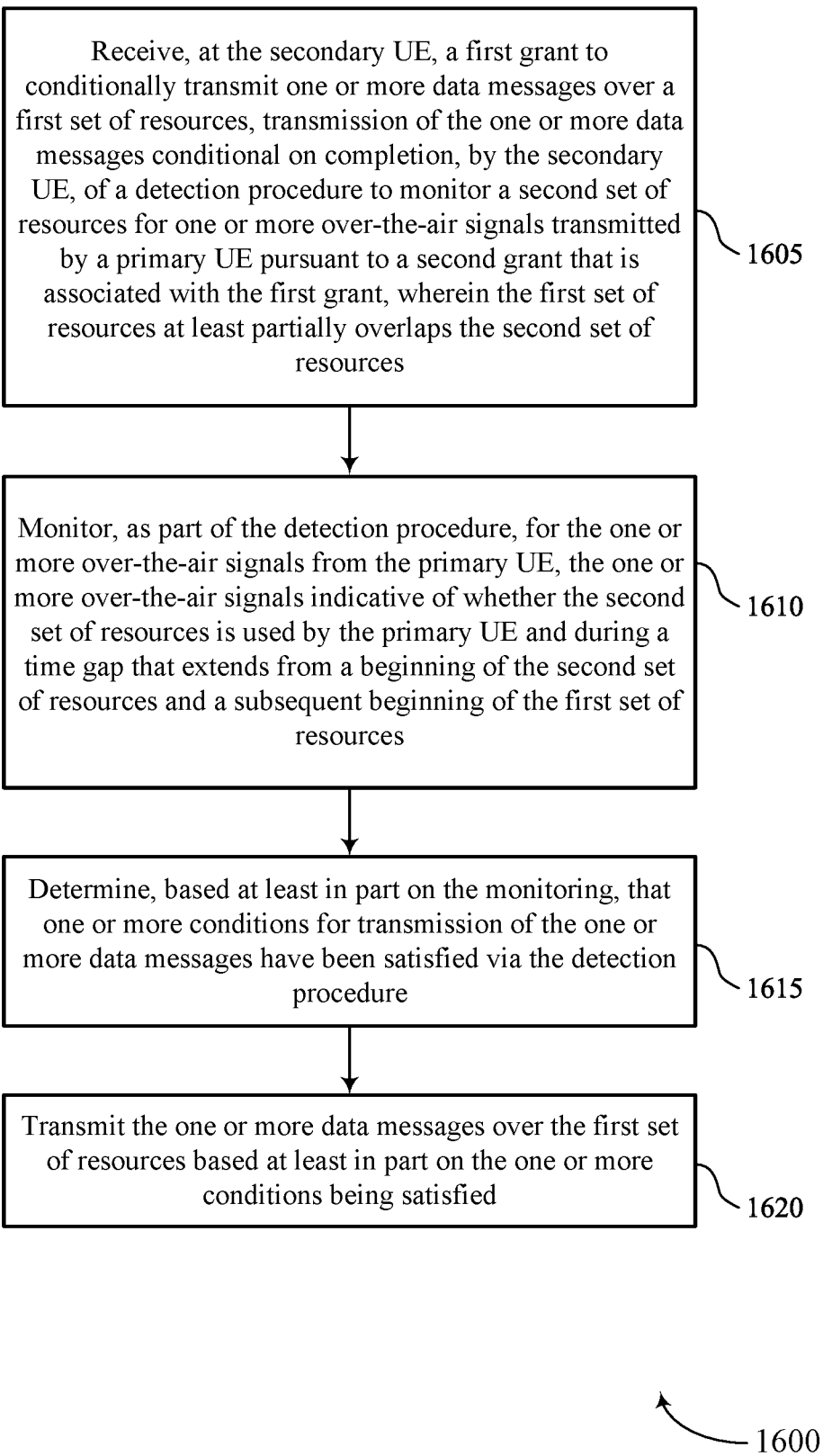

FIG. 16 shows a flowchart illustrating a method 1600 that supports techniques for granting resources for IoT communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The operations of 1605 may be performed in accordance with examples as disclosed herein. In some examples, aspects of the operations of 1605 may be performed by a UE conditional grant component 825 as described with reference to FIG. 8.

At 1610, the method may include monitoring, as part of the detection procedure, for the one or more OTA signals from the primary UE, the one or more OTA signals indicative of whether the second set of resources is used by the primary UE and during a time gap that extends from a beginning of the second set of resources and a subsequent beginning of the first set of resources. The operations of 1610 may be performed in accordance with examples as disclosed herein. In some examples, aspects of the operations of 1610 may be performed by a monitoring component 830 as described with reference to FIG. 8.

At 1615, the method may include determining, based on the monitoring, that one or more conditions for transmission of the one or more data messages have been satisfied via the detection procedure. The operations of 1615 may be performed in accordance with examples as disclosed herein. In some examples, aspects of the operations of 1615 may be performed by a grant validation component 835 as described with reference to FIG. 8.

At 1620, the method may include transmitting the one or more data messages over the first set of resources based on the one or more conditions being satisfied. The operations of 1620 may be performed in accordance with examples as disclosed herein. In some examples, aspects of the operations of 1620 may be performed by a message transmitter 840 as described with reference to FIG. 8.

Figure 17:
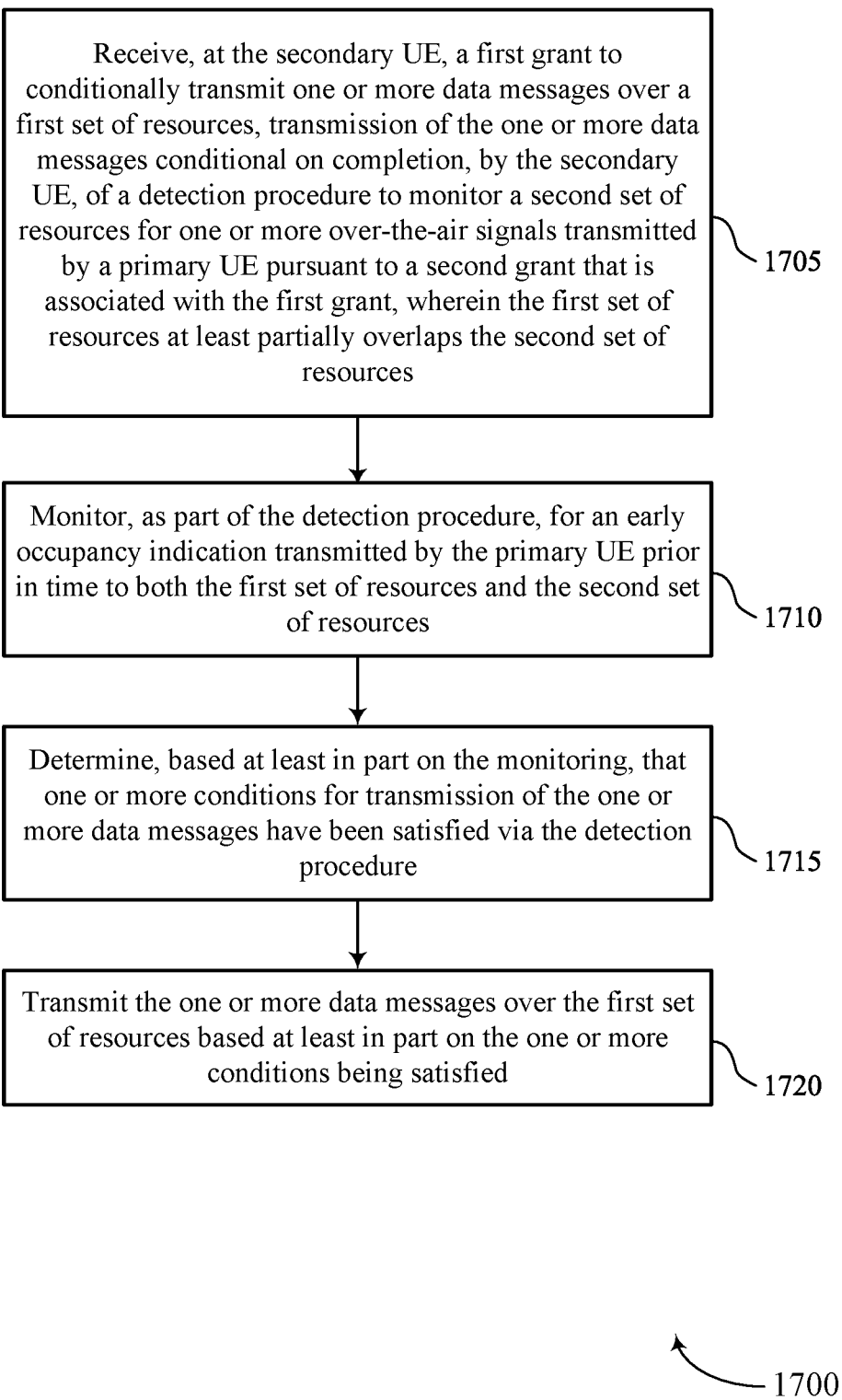

FIG. 17 shows a flowchart illustrating a method 1700 that supports techniques for granting resources for IoT communications in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The operations of 1705 may be performed in accordance with examples as disclosed herein. In some examples, aspects of the operations of 1705 may be performed by a UE conditional grant component 825 as described with reference to FIG. 8.

At 1710, the method may include monitoring, as part of the detection procedure, for an early occupancy indication transmitted by the primary UE prior in time to both the first set of resources and the second set of resources. The operations of 1710 may be performed in accordance with examples as disclosed herein. In some examples, aspects of the operations of 1710 may be performed by a monitoring component 830 as described with reference to FIG. 8.

At 1715, the method may include determining, based on the monitoring, that one or more conditions for transmission of the one or more data messages have been satisfied via the detection procedure. The operations of 1715 may be performed in accordance with examples as disclosed herein. In some examples, aspects of the operations of 1715 may be performed by a grant validation component 835 as described with reference to FIG. 8.

At 1720, the method may include transmitting the one or more data messages over the first set of resources based on the one or more conditions being satisfied. The operations of 1720 may be performed in accordance with examples as disclosed herein. In some examples, aspects of the operations of 1720 may be performed by a message transmitter 840 as described with reference to FIG. 8.

Figure 18:
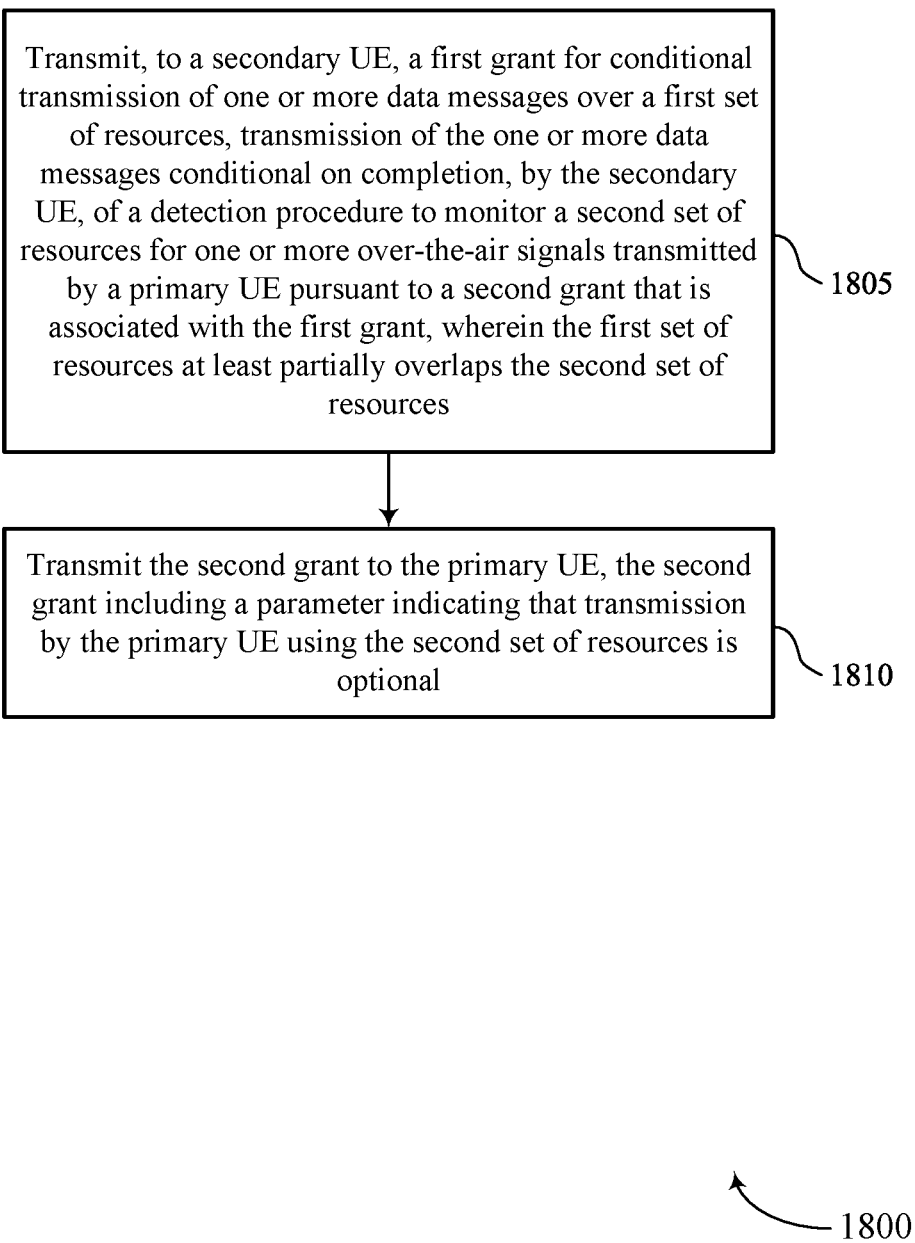

FIG. 18 shows a flowchart illustrating a method 1800 that supports techniques for granting resources for IoT communications in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources. The operations of 1805 may be performed in accordance with examples as disclosed herein. In some examples, aspects of the operations of 1805 may be performed by a conditional grant component 1225 as described with reference to FIG. 12.

At 1810, the method may include transmitting the second grant to the primary UE, the second grant including a parameter indicating that transmission by the primary UE using the second set of resources is optional. The operations of 1810 may be performed in accordance with examples as disclosed herein. In some examples, aspects of the operations of 1810 may be performed by a dynamic grant component 1230 as described with reference to FIG. 12.

Figure 19:
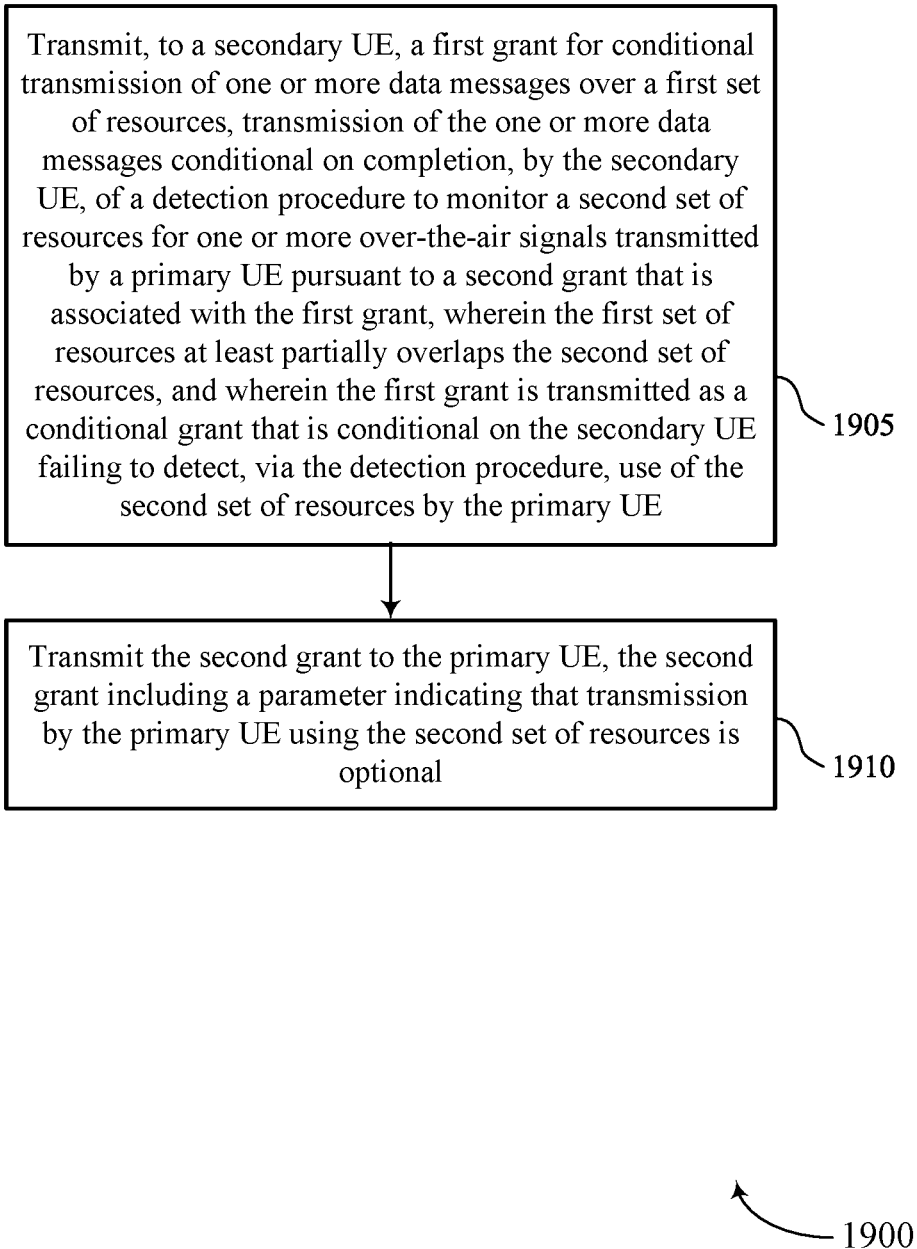

FIG. 19 shows a flowchart illustrating a method 1900 that supports techniques for granting resources for IoT communications in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, where the first set of resources at least partially overlaps the second set of resources, and where the first grant is transmitted as a conditional grant that is conditional on the secondary UE failing to detect, via the detection procedure, use of the second set of resources by the primary UE. The operations of 1905 may be performed in accordance with examples as disclosed herein. In some examples, aspects of the operations of 1905 may be performed by a conditional grant component 1225 as described with reference to FIG. 12.

At 1910, the method may include transmitting the second grant to the primary UE, the second grant including a parameter indicating that transmission by the primary UE using the second set of resources is optional. The operations of 1910 may be performed in accordance with examples as disclosed herein. In some examples, aspects of the operations of 1910 may be performed by a dynamic grant component 1230 as described with reference to FIG. 12.

The following provides an overview of aspects of the present disclosure:

Aspect 1: A method for wireless communication at a secondary UE, comprising: receiving, at the secondary UE, a first grant to conditionally transmit one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, wherein the first set of resources at least partially overlaps the second set of resources; monitoring, as part of the detection procedure, for the one or more OTA signals from the primary UE, the one or more OTA signals indicative of whether the second set of resources is used by the primary UE; determining, based at least in part on the monitoring, that one or more conditions for transmission of the one or more data messages have been satisfied via the detection procedure; and transmitting the one or more data messages over the first set of resources based at least in part on the one or more conditions being satisfied.

Aspect 2: The method of aspect 1, wherein determining that the one or more conditions have been satisfied comprises: failing to detect the one or more OTA signals from the primary UE.

Aspect 3: The method of any of aspects 1 and 2, wherein monitoring for the one or more OTA signals from the primary UE comprises: monitoring, as part of the detection procedure, during a time gap that extends from a beginning of the second set of resources and a subsequent beginning of the first set of resources.

Aspect 4: The method of aspect 3, wherein monitoring during the time gap comprises: monitoring the second set of resources during the time gap for the one or more OTA signals by the primary UE, wherein the one or more conditions are satisfied via the detection procedure upon failure by the secondary UE to detect the one or more OTA signals by the primary UE during the time gap.

Aspect 5: The method of aspect 3, wherein monitoring during the time gap comprises: monitoring the second set of resources for an LBT transmission during the time gap, wherein the time gap is defined by a CP extension for use by the primary UE to transmit the LBT transmission, wherein the one or more conditions are satisfied via the detection procedure upon failure by the secondary UE to detect an energy level during the time gap that is above a threshold.

Aspect 6: The method of any of aspects 3 and 5, wherein monitoring during the time gap comprises: monitoring the second set of resources during the time gap for the one or more OTA signals by the primary UE, wherein the time gap includes multiple transmission opportunities for the primary UE, wherein the one or more conditions are satisfied via the detection procedure upon failure by the secondary UE to detect any of the one or more OTA signals by the primary UE during the time gap.

Aspect 7: The method of aspect 3, wherein monitoring during the time gap comprises: monitoring the second set of resources during the time gap for one or more DMRS sequences associated with the primary UE, wherein the second set of resources are aggregated uplink slots and the time gap is at least one slot in duration, wherein the one or more conditions are satisfied via the detection procedure upon failure by the secondary UE to detect the one or more DMRS sequences during the time gap.

Aspect 8: The method of aspect 3, wherein monitoring during the time gap comprises: monitoring the second set of resources during the time gap for a SCI message by the primary UE, wherein the one or more conditions are satisfied via the detection procedure upon failure by the secondary UE to detect the SCI message during the time gap.

Aspect 9: The method of any of the aspects 3 and 8, wherein monitoring during the time gap comprises: monitoring the second set of resources during the time gap for both a SCI message by the primary UE and an ACK feedback message associated with the SCI message, wherein the one or more conditions are satisfied via the detection procedure upon detection by the secondary UE of the ACK feedback message during the time gap.

Aspect 10: The method of aspect 9, further comprising: determining a resource to monitor for the ACK feedback message by either decoding the SCI message or through the first grant.

Aspect 11: The method of aspect 1, wherein monitoring for the one or more OTA signals from the primary UE comprises: monitoring, as part of the detection procedure, for an early occupancy indication transmitted by the primary UE prior in time to both the first set of resources and the second set of resources.

Aspect 12: The method of aspect 11, wherein monitoring for the early occupancy indication comprises: monitoring for an SRS from the primary UE, wherein the one or more conditions are satisfied via the detection procedure upon failure by the secondary UE to detect the SRS as the early occupancy indication from the primary UE.

Aspect 13: The method of aspect 11, wherein monitoring for the early occupancy indication comprises: monitoring a sidelink feedback channel resource for the early occupancy indication from the primary UE, wherein the one or more conditions are satisfied via the detection procedure upon failure based at least in part on a content of the sidelink feedback channel resource.

Aspect 14: The method of any of aspects 1 through 13, further comprising: receiving, via the first grant, a first uplink control channel resource for transmission by the secondary UE of a first indication confirming transmission of the one or more data messages over the first set of resources, wherein the second grant also includes a second uplink control channel resource for transmission by the primary UE of a second indication confirming transmission over the second set of resources.

Aspect 15: The method of aspect 14, wherein the first indication by the secondary UE is an SR for retransmission of the one or more data messages.

Aspect 16: The method of any of aspects 1 through 15, further comprising: receiving, via the first grant, a first uplink control channel resource for transmission by the secondary UE of a message indicating whether the one or more conditions are satisfied.

Aspect 17: The method of any of aspects 1 through 16, wherein receiving the first grant comprises: receiving a DCI message that includes both the first grant and the second grant.

Aspect 18: The method of aspect 17, wherein the DCI message is scrambled by a GC-RNTI that is allocated to at least the secondary UE and the primary UE as supporting non-provisioning proactive dynamic grants and that have downlink control channel aggregation levels that are within common thresholds.

Aspect 19: A method for wireless communication at a base station, comprising: transmitting, to a secondary UE, a first grant for conditional transmission of one or more data messages over a first set of resources, transmission of the one or more data messages conditional on completion, by the secondary UE, of a detection procedure to monitor a second set of resources for one or more OTA signals transmitted by a primary UE pursuant to a second grant that is associated with the first grant, wherein the first set of resources at least partially overlaps the second set of resources; and transmitting the second grant to the primary UE, the second grant including a parameter indicating that transmission by the primary UE using the second set of resources is optional.

Aspect 20: The method of aspect 19, wherein transmitting the second grant to the primary UE comprises: transmitting the parameter as a bit field which indicates that use of the second set of resources by the primary UE is based on whether the primary UE has content to transmit during the second set of resources.

Aspect 21: The method of any of aspects 19 and 20, wherein transmitting the first grant for conditional transmission of the one or more data messages comprises: transmitting the first grant as a conditional grant that is conditional on the secondary UE failing to detect, via the detection procedure, use of the second set of resources by the primary UE.

Aspect 22: The method of any of aspects 19 through 21, wherein a time gap extends from a beginning of the second set of resources and a subsequent beginning of the first set of resources.

Aspect 23: The method of aspect 22, wherein transmitting the first grant for conditional transmission of the one or more data messages comprises: transmitting the first grant as a conditional grant that is conditional on the secondary UE failing to detect, via the detection procedure, one or more OTA signals by the primary UE during the time gap.

Aspect 24: The method of aspect 22, wherein transmitting the first grant for conditional transmission of the one or more data messages comprises: transmitting the first grant as a conditional grant that is conditional on the secondary UE failing to detect, via the detection procedure, an LBT transmission by the primary UE during the time gap, wherein the time gap is defined by a CP extension for use by the primary UE to transmit the LBT transmission.

Aspect 25: The method of any of aspects 22 and 24, wherein the time gap includes multiple transmission opportunities for the primary UE.

Aspect 26: The method of any of aspects 22, 24, and 25, wherein the second set of resources are aggregated uplink slots and the time gap is at least one slot in duration.

Aspect 27: The method of any of aspects 19 through 26, further comprising: transmitting, via the first grant, a first uplink control channel resource for use by the secondary UE to transmit a first indication confirming transmission of the one or more data messages over the first set of resources; and transmitting, via the second grant, a second uplink control channel resource for use by the primary UE to transmit a second indication confirming transmission over the second set of resources.

Aspect 28: The method of aspect 27, further comprising: receiving the first indication from the secondary UE via an SR for retransmission of the one or more data messages.

Aspect 29: The method of any of aspects 19 through 28, further comprising: transmitting, via the first grant, a first uplink control channel resource for use by the secondary UE to transmit a message indicating whether one or more conditions associated with the conditional transmission of the one or more data messages over the first set of resources are satisfied.

Aspect 30: The method of any of aspects 19 through 29, wherein the first grant and the second grant are transmitted in a same DCI message.

Aspect 31: The method of aspect 30, wherein the DCI message is scrambled by a GC-RNTI that is allocated to at least the secondary UE and the primary UE as supporting non-provisioning proactive dynamic grants and that have downlink control channel aggregation levels that are within common thresholds.

Aspect 32: An apparatus for wireless communication at a secondary UE, comprising a processor; memory coupled with the processor; and instructions stored in the memory and executable by the processor to cause the apparatus to perform a method of any of aspects 1 through 18.

Aspect 33: An apparatus for wireless communication at a secondary UE, comprising at least one means for performing a method of any of aspects 1 through 18.

Aspect 34: A non-transitory computer-readable medium storing code for wireless communication at a secondary UE, the code comprising instructions executable by a processor to perform a method of any of aspects 1 through 18.

Aspect 35: An apparatus for wireless communication at a base station, comprising a processor; memory coupled with the processor; and instructions stored in the memory and executable by the processor to cause the apparatus to perform a method of any of aspects 19 through 31.

Aspect 36: An apparatus for wireless communication at a base station, comprising at least one means for performing a method of any of aspects 19 through 31.

Aspect 37: A non-transitory computer-readable medium storing code for wireless communication at a base station, the code comprising instructions executable by a processor to perform a method of any of aspects 19 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a secondary user equipment (UE), comprising:
    receiving, at the secondary UE, a first dynamic grant that indicates a first set of resources available to the secondary UE to use to conditionally transmit one or more data messages, transmission of the one or more data messages conditional on completion, by the secondary UE, of a detection procedure to monitor a second set of resources for one or more over-the-air signals transmitted by a primary UE pursuant to a second dynamic grant that is associated with the first dynamic grant, wherein the first set of resources partially overlaps the second set of resources;
    monitoring, as part of the detection procedure, the second set of resources for the one or more over-the-air signals from the primary UE, the one or more over-the-air signals indicative of whether the second set of resources is used by the primary UE;
    determining, based at least in part on the monitoring, that one or more conditions for transmission of the one or more data messages have been satisfied via the detection procedure; and
    transmitting the one or more data messages over the first set of resources based at least in part on the one or more conditions being satisfied.

2. The method of claim 1, wherein monitoring for the one or more over-the-air signals from the primary UE comprises:
    monitoring, as part of the detection procedure, during a time gap that extends from a beginning of the second set of resources and a subsequent beginning of the first set of resources.

3. The method of claim 2, wherein monitoring during the time gap comprises:
    monitoring the second set of resources during the time gap for the one or more over-the-air signals by the primary UE, wherein the one or more conditions are satisfied via the detection procedure upon failure by the secondary UE to detect the one or more over-the-air signals by the primary UE during the time gap.

4. The method of claim 2, wherein monitoring during the time gap comprises:
    monitoring the second set of resources for a listen-before-talk transmission during the time gap, wherein the time gap is defined by a cyclic prefix extension for use by the primary UE to transmit the listen-before-talk transmission, wherein the one or more conditions are satisfied via the detection procedure upon failure by the secondary UE to detect an energy level during the time gap that is above a threshold.

5. The method of claim 1, further comprising:
    receiving, via the first dynamic grant, a first uplink control channel resource for transmission by the secondary UE of a first indication confirming transmission of the one or more data messages over the first set of resources, wherein the second dynamic grant also includes a second uplink control channel resource for transmission by the primary UE of a second indication confirming transmission over the second set of resources.

6. The method of claim 5, wherein the first indication by the secondary UE is a scheduling request for retransmission of the one or more data messages.

7. The method of claim 1, further comprising:
receiving, via the first dynamic grant, a first uplink control channel resource for transmission by the secondary UE of a message indicating whether the one or more conditions are satisfied.

8. The method of claim 1, wherein receiving the first dynamic grant comprises:
receiving a downlink control information message that includes both the first dynamic grant and the second dynamic grant.

9. The method of claim 8, wherein the downlink control information message is scrambled by a group common random network temporary identifier (GC-RNTI) that is allocated to at least the secondary UE and the primary UE as supporting non-provisioning proactive dynamic grants and that have downlink control channel aggregation levels that are within common thresholds.

10. A method for wireless communication at a network device, comprising:
transmitting, to a secondary user equipment (UE), a first dynamic grant that indicates a first set of resources available to the secondary UE to use for conditional transmission of one or more data messages, transmission of the one or more data messages conditional on completion, by the secondary UE, of a detection procedure to monitor a second set of resources for one or more over-the-air signals transmitted by a primary UE pursuant to a second dynamic grant that is associated with the first dynamic grant, wherein the first set of resources partially overlaps the second set of resources; and
transmitting the second dynamic grant to the primary UE, the second dynamic grant including a parameter indicating that transmission by the primary UE using the second set of resources is optional.

11. The method of claim 10, wherein transmitting the first dynamic grant for conditional transmission of the one or more data messages comprises:
transmitting the first dynamic grant as a conditional grant that is conditional on the secondary UE failing to detect, via the detection procedure, use of the second set of resources by the primary UE.

12. The method of claim 10, wherein a time gap extends from a beginning of the second set of resources and a subsequent beginning of the first set of resources.

13. The method of claim 12, wherein transmitting the first dynamic grant for conditional transmission of the one or more data messages comprises:
transmitting the first dynamic grant as a conditional grant that is conditional on the secondary UE failing to detect, via the detection procedure, the one or more over-the-air signals by the primary UE during the time gap.

14. The method of claim 12, wherein transmitting the first dynamic grant for conditional transmission of the one or more data messages comprises:
transmitting the first dynamic grant as a conditional grant that is conditional on the secondary UE failing to detect, via the detection procedure, a listen-before-talk transmission by the primary UE during the time gap, wherein the time gap is defined by a cyclic prefix extension for use by the primary UE to transmit the listen-before-talk transmission.

15. The method of claim 10, further comprising:
transmitting, via the first dynamic grant, a first uplink control channel resource for use by the secondary UE to transmit a first indication confirming transmission of the one or more data messages over the first set of resources; and
transmitting, via the second dynamic grant, a second uplink control channel resource for use by the primary UE to transmit a second indication confirming transmission over the second set of resources.

16. The method of claim 15, further comprising:
receiving the first indication from the secondary UE via a scheduling request for retransmission of the one or more data messages.

17. The method of claim 10, further comprising:
transmitting, via the first dynamic grant, a first uplink control channel resource for use by the secondary UE to transmit a message indicating whether one or more conditions associated with the conditional transmission of the one or more data messages over the first set of resources are satisfied.

18. The method of claim 10, wherein the first dynamic grant and the second dynamic grant are transmitted in a same downlink control information message.

19. The method of claim 18, wherein the downlink control information message is scrambled by a group common random network temporary identifier (GC-RNTI) that is allocated to at least the secondary UE and the primary UE as supporting non-provisioning proactive dynamic grants and that have downlink control channel aggregation levels that are within common thresholds.

20. An apparatus for wireless communication at a secondary user equipment (UE), comprising:
a processor;
memory coupled with the processor; and
instructions stored in the memory and executable by the processor to cause the apparatus to:
receive, at the secondary UE, a first dynamic grant that indicates a first set of resources available to the secondary UE to use to conditionally transmit one or more data messages, transmission of the one or more data messages conditional on completion, by the secondary UE, of a detection procedure to monitor a second set of resources for one or more over-the-air signals transmitted by a primary UE pursuant to a second dynamic grant that is associated with the first dynamic grant, wherein the first set of resources partially overlaps the second set of resources;
monitor, as part of the detection procedure, the second set of resources for the one or more over-the-air signals from the primary UE, the one or more over-the-air signals indicative of whether the second set of resources is used by the primary UE;
determine, based at least in part on the monitoring, that one or more conditions for transmission of the one or more data messages have been satisfied via the detection procedure; and
transmit the one or more data messages over the first set of resources based at least in part on the one or more conditions being satisfied.

21. An apparatus for wireless communication at a network device, comprising:
a processor;
memory coupled with the processor; and
instructions stored in the memory and executable by the processor to cause the apparatus to:
transmit, to a secondary user equipment (UE), a first dynamic grant that indicates a first set of resources available to the secondary UE to use for conditional transmission of one or more data messages, transmission of the one or more data messages conditional on completion, by the secondary UE, of a detection procedure to monitor a second set of resources for one or more over-the-air signals transmitted by a primary UE pursuant to a second dynamic grant that is associated with the first dynamic grant, wherein the first set of resources partially overlaps the second set of resources; and transmit the second dynamic grant to the primary UE, the second dynamic grant including a parameter indicating that transmission by the primary UE using the second set of resources is optional.

\* \* \* \* \*